US008094137B2

(12) United States Patent
Morrison

(10) Patent No.: US 8,094,137 B2
(45) Date of Patent: Jan. 10, 2012

(54) SYSTEM AND METHOD OF DETECTING CONTACT ON A DISPLAY

(75) Inventor: Gerald Morrison, Calgary (CA)

(73) Assignee: Smart Technologies ULC (CA)

( * ) Notice: Subject to any disclaimer, the term of this patent is extended or adjusted under 35 U.S.C. 154(b) by 998 days.

(21) Appl. No.: 11/781,811

(22) Filed: Jul. 23, 2007

(65) Prior Publication Data
US 2009/0027357 A1    Jan. 29, 2009

(51) Int. Cl.
G06F 3/042  (2006.01)
(52) U.S. Cl. ...................................... 345/175
(58) Field of Classification Search .................. 345/166, 345/173, 175; 178/18.01; 349/64; 250/221, 250/222.1; 385/17
See application file for complete search history.

(56) References Cited

U.S. PATENT DOCUMENTS

| | | |
|---|---|---|
| 2,769,374 A | 11/1956 | Sick |
| 3,025,406 A | 3/1962 | Stewart et al. |
| 3,128,340 A | 4/1964 | Harmon |
| 3,187,185 A | 6/1965 | Milnes |
| 3,360,654 A | 12/1967 | Muller |
| 3,364,881 A | 1/1968 | Kool |
| 3,478,220 A | 11/1969 | Milroy |
| 3,613,066 A | 10/1971 | Cooreman |
| 3,764,813 A | 10/1973 | Clement et al. |
| 3,775,560 A | 11/1973 | Ebeling et al. |
| 3,857,022 A | 12/1974 | Rebane et al. |
| 3,860,754 A | 1/1975 | Johnson et al. |
| 4,107,522 A | 8/1978 | Walter |
| 4,144,449 A | 3/1979 | Funk et al. |
| 4,243,879 A | 1/1981 | Carroll et al. |
| 4,247,767 A | 1/1981 | O'Brien et al. |
| 4,372,631 A | 2/1983 | Leon |
| D270,788 S | 10/1983 | Umanoff et al. |
| 4,420,261 A | 12/1983 | Barlow et al. |
| 4,459,476 A | 7/1984 | Weissmueller et al. |
| 4,468,694 A | 8/1984 | Edgar |

(Continued)

FOREIGN PATENT DOCUMENTS
AU    2003233728 A1    12/2003
(Continued)

OTHER PUBLICATIONS

International Search Report and Written Opinion for PCT/CA2007/002184 mailed Mar. 13, 2008 (13 Pages).

(Continued)

Primary Examiner — Abbas Abdulselam
(74) Attorney, Agent, or Firm — Katten Muchin Rosenman LLP

(57) ABSTRACT

A system for detecting contact on a display is provided. The system comprises a planar medium associated with the display and includes at least one edge facet and opposing surfaces. The system also includes one or more optical sources operatively coupled to the at least one edge facet for transmitting an optical signal into the planar medium such that the transmitted optical signal is totally internally reflected between the at least one edge facet and opposing surfaces. An optical sensing device is positioned to substantially face at least a portion of the edge facet and adapted to detect at least one object contacting a first surface of the opposing surfaces. The optical sensing device is operative to detect a portion of the optical signal emitted from the first surface at a location corresponding to the object contacting the first surface.

45 Claims, 9 Drawing Sheets

U.S. PATENT DOCUMENTS

| | | |
|---|---|---|
| 4,507,557 A | 3/1985 | Tsikos |
| 4,550,250 A | 10/1985 | Mueller et al. |
| 4,553,842 A | 11/1985 | Griffin |
| 4,558,313 A | 12/1985 | Garwin et al. |
| D286,831 S | 11/1986 | Matyear |
| D290,199 S | 6/1987 | Hampshire |
| 4,672,364 A | 6/1987 | Lucas |
| 4,673,918 A | 6/1987 | Adler et al. |
| 4,703,316 A | 10/1987 | Sherbeck |
| 4,710,760 A | 12/1987 | Kasday |
| 4,737,631 A | 4/1988 | Sasaki et al. |
| 4,742,221 A | 5/1988 | Sasaki et al. |
| 4,746,770 A | 5/1988 | McAvinney |
| 4,762,990 A | 8/1988 | Caswell et al. |
| 4,766,424 A | 8/1988 | Adler et al. |
| 4,782,328 A | 11/1988 | Denlinger |
| 4,811,004 A | 3/1989 | Person et al. |
| 4,818,826 A | 4/1989 | Kimura |
| 4,820,050 A | 4/1989 | Griffin |
| 4,822,145 A | 4/1989 | Staelin |
| 4,831,455 A | 5/1989 | Ishikawa |
| 4,851,664 A | 7/1989 | Rieger |
| 4,868,551 A | 9/1989 | Arditty et al. |
| 4,868,912 A | 9/1989 | Doering |
| 4,888,479 A | 12/1989 | Tamaru |
| 4,893,120 A | 1/1990 | Doering et al. |
| D306,105 S | 2/1990 | Newhouse |
| 4,916,308 A | 4/1990 | Meadows |
| 4,928,094 A | 5/1990 | Smith |
| 4,943,806 A | 7/1990 | Masters et al. |
| D312,928 S | 12/1990 | Scheffers |
| 4,980,547 A | 12/1990 | Griffin |
| 4,990,901 A | 2/1991 | Beiswenger |
| 5,025,314 A | 6/1991 | Tang et al. |
| 5,025,411 A | 6/1991 | Tallman et al. |
| D318,660 S | 7/1991 | Weber |
| 5,097,516 A | 3/1992 | Amir |
| 5,103,085 A | 4/1992 | Zimmerman |
| 5,105,186 A | 4/1992 | May |
| 5,109,435 A | 4/1992 | Lo et al. |
| 5,130,794 A | 7/1992 | Ritchey |
| 5,140,647 A | 8/1992 | Ise et al. |
| 5,148,015 A | 9/1992 | Dolan |
| 5,162,618 A | 11/1992 | Knowles |
| 5,162,783 A | 11/1992 | Moreno |
| 5,164,714 A | 11/1992 | Wehrer |
| 5,168,531 A | 12/1992 | Sigel |
| 5,179,369 A | 1/1993 | Person et al. |
| 5,196,835 A | 3/1993 | Blue et al. |
| 5,196,836 A | 3/1993 | Williams |
| 5,239,152 A | 8/1993 | Caldwell et al. |
| 5,239,373 A | 8/1993 | Tang et al. |
| 5,272,470 A | 12/1993 | Zetts |
| 5,317,140 A | 5/1994 | Dunthorn |
| 5,359,155 A | 10/1994 | Helser |
| D353,368 S | 12/1994 | Poulos |
| 5,374,971 A | 12/1994 | Clapp et al. |
| 5,414,413 A | 5/1995 | Tamaru et al. |
| 5,422,494 A | 6/1995 | West et al. |
| 5,448,263 A | 9/1995 | Martin |
| 5,457,289 A | 10/1995 | Huang et al. |
| 5,483,261 A | 1/1996 | Yasutake |
| 5,483,603 A | 1/1996 | Luke et al. |
| 5,484,966 A | 1/1996 | Segen |
| 5,490,655 A | 2/1996 | Bates |
| 5,502,568 A | 3/1996 | Ogawa et al. |
| 5,525,764 A | 6/1996 | Junkins et al. |
| 5,528,263 A | 6/1996 | Platzker et al. |
| 5,528,290 A | 6/1996 | Saund |
| 5,537,107 A | 7/1996 | Funado |
| D372,601 S | 8/1996 | Roberts et al. |
| 5,554,828 A | 9/1996 | Primm |
| 5,581,276 A | 12/1996 | Cipolla et al. |
| 5,581,637 A | 12/1996 | Cass et al. |
| 5,591,945 A | 1/1997 | Kent |
| 5,594,469 A | 1/1997 | Freeman et al. |
| 5,594,502 A | 1/1997 | Bito et al. |
| 5,617,312 A | 4/1997 | Iura et al. |
| 5,638,092 A | 6/1997 | Eng et al. |
| 5,670,755 A | 9/1997 | Kwon |
| 5,686,942 A | 11/1997 | Ball |
| 5,698,845 A | 12/1997 | Kodama et al. |
| 5,729,704 A | 3/1998 | Stone et al. |
| 5,734,375 A | 3/1998 | Knox et al. |
| 5,736,686 A | 4/1998 | Perret, Jr. et al. |
| 5,737,740 A | 4/1998 | Henderson et al. |
| 5,739,479 A | 4/1998 | Davis-Cannon |
| 5,745,116 A | 4/1998 | Pisutha-Arnond |
| 5,764,223 A | 6/1998 | Chang et al. |
| 5,771,039 A | 6/1998 | Ditzik |
| 5,784,054 A | 7/1998 | Armstrong et al. |
| 5,785,439 A | 7/1998 | Bowen |
| 5,786,810 A | 7/1998 | Knox et al. |
| 5,790,910 A | 8/1998 | Haskin |
| 5,801,704 A | 9/1998 | Oohara et al. |
| 5,804,773 A | 9/1998 | Wilson et al. |
| 5,818,421 A | 10/1998 | Ogino et al. |
| 5,818,424 A | 10/1998 | Korth |
| 5,819,201 A | 10/1998 | DeGraaf |
| 5,825,352 A | 10/1998 | Bisset et al. |
| 5,831,602 A | 11/1998 | Sato et al. |
| 5,909,210 A | 6/1999 | Knox et al. |
| 5,911,004 A | 6/1999 | Ohuchi et al. |
| 5,914,709 A | 6/1999 | Graham et al. |
| 5,920,342 A | 7/1999 | Umeda et al. |
| 5,936,615 A | 8/1999 | Waters |
| 5,940,065 A | 8/1999 | Babb et al. |
| 5,943,783 A | 8/1999 | Jackson |
| 5,963,199 A | 10/1999 | Kato et al. |
| 5,982,352 A | 11/1999 | Pryor |
| 5,988,645 A | 11/1999 | Downing |
| 5,990,874 A | 11/1999 | Tsumura |
| 6,002,808 A | 12/1999 | Freeman |
| 6,008,798 A | 12/1999 | Mato, Jr. et al. |
| 6,031,531 A | 2/2000 | Kimble |
| 6,061,177 A | 5/2000 | Fujimoto |
| 6,075,905 A | 6/2000 | Herman et al. |
| 6,076,041 A | 6/2000 | Watanabe |
| 6,091,406 A | 7/2000 | Kambara et al. |
| 6,100,538 A | 8/2000 | Ogawa |
| 6,104,387 A | 8/2000 | Chery et al. |
| 6,118,433 A | 9/2000 | Jenkin et al. |
| 6,122,865 A | 9/2000 | Branc et al. |
| 6,128,003 A | 10/2000 | Smith et al. |
| 6,141,000 A | 10/2000 | Martin |
| 6,147,678 A | 11/2000 | Kumar et al. |
| 6,153,836 A | 11/2000 | Goszyk |
| 6,161,066 A | 12/2000 | Wright et al. |
| 6,179,426 B1 | 1/2001 | Rodriguez, Jr. et al. |
| 6,188,388 B1 | 2/2001 | Arita et al. |
| 6,191,773 B1 | 2/2001 | Maruno et al. |
| 6,208,329 B1 | 3/2001 | Ballare |
| 6,208,330 B1 | 3/2001 | Hasegawa et al. |
| 6,209,266 B1 | 4/2001 | Branc et al. |
| 6,215,477 B1 | 4/2001 | Morrison et al. |
| 6,222,175 B1 | 4/2001 | Krymski |
| 6,226,035 B1 | 5/2001 | Korein et al. |
| 6,229,529 B1 | 5/2001 | Yano et al. |
| 6,252,989 B1 | 6/2001 | Geisler et al. |
| 6,256,033 B1 | 7/2001 | Nguyen |
| 6,262,718 B1 | 7/2001 | Findlay et al. |
| 6,310,610 B1 | 10/2001 | Beaton et al. |
| 6,320,597 B1 | 11/2001 | Ieperen |
| 6,323,846 B1 | 11/2001 | Westerman et al. |
| 6,326,954 B1 | 12/2001 | Van Ieperen |
| 6,328,270 B1 | 12/2001 | Elberbaum |
| 6,335,724 B1 | 1/2002 | Takekawa et al. |
| 6,337,681 B1 | 1/2002 | Martin |
| 6,339,748 B1 | 1/2002 | Hiramatsu |
| 6,346,966 B1 | 2/2002 | Toh |
| 6,352,351 B1 | 3/2002 | Ogasahara et al. |
| 6,353,434 B1 | 3/2002 | Akebi et al. |
| 6,359,612 B1 | 3/2002 | Peter et al. |
| 6,362,468 B1 | 3/2002 | Murakami et al. |
| 6,377,228 B1 | 4/2002 | Jenkin et al. |
| 6,384,743 B1 | 5/2002 | Vanderheiden |
| 6,414,671 B1 | 7/2002 | Gillespie et al. |

| | | |
|---|---|---|
| 6,414,673 B1 | 7/2002 | Wood et al. |
| 6,421,042 B1 | 7/2002 | Omura et al. |
| 6,427,389 B1 | 8/2002 | Branc et al. |
| 6,429,856 B1 | 8/2002 | Omura et al. |
| 6,429,857 B1 | 8/2002 | Masters et al. |
| D462,346 S | 9/2002 | Abboud |
| D462,678 S | 9/2002 | Abboud |
| 6,480,187 B1 | 11/2002 | Sano et al. |
| 6,496,122 B2 | 12/2002 | Sampsell |
| 6,497,608 B2 | 12/2002 | Ho et al. |
| 6,498,602 B1 | 12/2002 | Ogawa |
| 6,504,532 B1 | 1/2003 | Ogasahara et al. |
| 6,507,339 B1 | 1/2003 | Tanaka |
| 6,512,838 B1 | 1/2003 | Rafii et al. |
| 6,517,266 B2 | 2/2003 | Saund |
| 6,518,600 B1 | 2/2003 | Shaddock |
| 6,522,830 B2 | 2/2003 | Yamagami |
| 6,529,189 B1 | 3/2003 | Colgan et al. |
| 6,530,664 B2 | 3/2003 | Vanderwerf et al. |
| 6,531,999 B1 | 3/2003 | Trajkovic |
| 6,532,006 B1 | 3/2003 | Takekawa et al. |
| 6,540,366 B2 | 4/2003 | Keenan et al. |
| 6,540,679 B2 | 4/2003 | Slayton et al. |
| 6,545,669 B1 | 4/2003 | Kinawi et al. |
| 6,545,670 B1 | 4/2003 | Pryor |
| 6,559,813 B1 | 5/2003 | DeLuca et al. |
| 6,563,491 B1 | 5/2003 | Omura |
| 6,567,078 B2 | 5/2003 | Ogawa |
| 6,567,121 B1 | 5/2003 | Kuno |
| 6,570,103 B1 | 5/2003 | Saka et al. |
| 6,570,612 B1 | 5/2003 | Saund et al. |
| 6,577,299 B1 | 6/2003 | Schiller et al. |
| 6,587,099 B2 | 7/2003 | Takekawa |
| 6,590,568 B1 | 7/2003 | Astala et al. |
| 6,594,023 B1 | 7/2003 | Omura et al. |
| 6,597,348 B1 | 7/2003 | Yamazaki et al. |
| 6,597,508 B2 | 7/2003 | Seino et al. |
| 6,603,867 B1 | 8/2003 | Sugino et al. |
| 6,608,619 B2 | 8/2003 | Omura et al. |
| 6,608,636 B1 | 8/2003 | Roseman |
| 6,614,422 B1 | 9/2003 | Rafii et al. |
| 6,624,833 B1 | 9/2003 | Kumar et al. |
| 6,626,718 B2 | 9/2003 | Hiroki |
| 6,630,922 B2 | 10/2003 | Fishkin et al. |
| 6,633,328 B1 | 10/2003 | Byrd et al. |
| 6,650,318 B1 | 11/2003 | Arnon |
| 6,650,822 B1 | 11/2003 | Zhou |
| 6,674,424 B1 | 1/2004 | Fujioka |
| 6,683,584 B2 | 1/2004 | Ronzani et al. |
| 6,690,357 B1 | 2/2004 | Dunton et al. |
| 6,690,363 B2 | 2/2004 | Newton |
| 6,690,397 B1 | 2/2004 | Daignault, Jr. |
| 6,710,770 B2 | 3/2004 | Tomasi et al. |
| 6,714,311 B2 | 3/2004 | Hashimoto |
| 6,720,949 B1 | 4/2004 | Pryor et al. |
| 6,736,321 B2 | 5/2004 | Tsikos et al. |
| 6,738,051 B2 | 5/2004 | Boyd et al. |
| 6,741,250 B1 | 5/2004 | Furlan et al. |
| 6,747,636 B2 | 6/2004 | Martin |
| 6,756,910 B2 | 6/2004 | Ohba et al. |
| 6,760,009 B2 | 7/2004 | Omura et al. |
| 6,760,999 B2 | 7/2004 | Branc et al. |
| 6,774,889 B1 | 8/2004 | Zhang et al. |
| 6,803,906 B1 | 10/2004 | Morrison et al. |
| 6,828,959 B2 | 12/2004 | Takekawa et al. |
| 6,864,882 B2 | 3/2005 | Newton |
| 6,867,886 B2 | 3/2005 | Lassen |
| 6,911,972 B2 | 6/2005 | Brinjes |
| 6,919,880 B2 | 7/2005 | Morrison et al. |
| 6,927,384 B2 | 8/2005 | Reime et al. |
| 6,933,981 B1 | 8/2005 | Kishida et al. |
| 6,947,032 B2 | 9/2005 | Morrison et al. |
| 6,954,197 B2 | 10/2005 | Morrison et al. |
| 6,972,401 B2 | 12/2005 | Akitt et al. |
| 6,972,753 B1 | 12/2005 | Kimura et al. |
| 7,002,555 B1 | 2/2006 | Jacobsen et al. |
| 7,007,236 B2 | 2/2006 | Dempski et al. |
| 7,015,418 B2 | 3/2006 | Cahill et al. |
| 7,030,861 B1 | 4/2006 | Westerman et al. |
| 7,057,647 B1 | 6/2006 | Monroe |
| 7,058,204 B2 | 6/2006 | Hildreth et al. |
| 7,075,054 B2 | 7/2006 | Iwamoto et al. |
| 7,084,857 B2 | 8/2006 | Lieberman et al. |
| 7,084,868 B2 | 8/2006 | Farag et al. |
| 7,098,392 B2 | 8/2006 | Sitrick et al. |
| 7,121,470 B2 | 10/2006 | McCall et al. |
| 7,129,927 B2 | 10/2006 | Mattsson |
| 7,151,533 B2 | 12/2006 | Van Ieperen |
| 7,176,904 B2 | 2/2007 | Satoh |
| 7,184,030 B2 | 2/2007 | McCharles et al. |
| 7,187,489 B2 | 3/2007 | Miles |
| 7,190,496 B2 | 3/2007 | Klug et al. |
| 7,202,860 B2 | 4/2007 | Ogawa |
| 7,227,526 B2 | 6/2007 | Hildreth et al. |
| 7,232,986 B2 | 6/2007 | Worthington et al. |
| 7,236,162 B2 | 6/2007 | Morrison et al. |
| 7,237,937 B2 | 7/2007 | Kawashima et al. |
| 7,242,388 B2 | 7/2007 | Lieberman et al. |
| 7,265,748 B2 | 9/2007 | Ryynanen |
| 7,268,692 B1 | 9/2007 | Lieberman |
| 7,274,356 B2 | 9/2007 | Ung et al. |
| 7,283,126 B2 | 10/2007 | Leung |
| 7,283,128 B2 | 10/2007 | Sato |
| 7,289,113 B2 | 10/2007 | Martin |
| 7,302,156 B1 | 11/2007 | Lieberman et al. |
| 7,305,368 B2 | 12/2007 | Lieberman et al. |
| 7,327,376 B2 | 2/2008 | Shen et al. |
| 7,330,184 B2 | 2/2008 | Leung |
| 7,333,094 B2 | 2/2008 | Lieberman et al. |
| 7,333,095 B1 | 2/2008 | Lieberman et al. |
| 7,355,593 B2 | 4/2008 | Hill et al. |
| 7,372,456 B2 | 5/2008 | McLintock |
| 7,375,720 B2 | 5/2008 | Tanaka |
| RE40,368 E | 6/2008 | Arnon |
| D571,365 S | 6/2008 | Morelock et al. |
| D571,803 S | 6/2008 | Morelock et al. |
| D571,804 S | 6/2008 | Morelock et al. |
| 7,403,837 B2 | 7/2008 | Graiger et al. |
| 7,411,575 B2 | 8/2008 | Hill et al. |
| 7,414,617 B2 | 8/2008 | Ogawa |
| 7,479,949 B2 | 1/2009 | Jobs et al. |
| 7,492,357 B2 | 2/2009 | Morrison et al. |
| 7,499,037 B2 | 3/2009 | Lube |
| 7,515,143 B2 | 4/2009 | Keam |
| 7,538,759 B2 * | 5/2009 | Newton ................. 345/173 |
| 7,559,664 B1 | 7/2009 | Walleman et al. |
| 7,593,593 B2 | 9/2009 | Wilson |
| 7,619,617 B2 | 11/2009 | Morrison et al. |
| 7,630,002 B2 | 12/2009 | Jenkins |
| 7,692,625 B2 | 4/2010 | Morrison et al. |
| 7,705,835 B2 * | 4/2010 | Eikman ................. 345/176 |
| 7,710,391 B2 | 5/2010 | Bell et al. |
| 7,728,821 B2 * | 6/2010 | Hillis et al. ............ 345/173 |
| 2001/0012001 A1 | 8/2001 | Rekimoto et al. |
| 2001/0019325 A1 | 9/2001 | Takekawa |
| 2001/0022579 A1 | 9/2001 | Hirabayashi |
| 2001/0026268 A1 | 10/2001 | Ito |
| 2001/0033274 A1 | 10/2001 | Ong |
| 2001/0050677 A1 | 12/2001 | Tosaya |
| 2001/0055006 A1 | 12/2001 | Sano et al. |
| 2002/0008692 A1 | 1/2002 | Omura et al. |
| 2002/0015159 A1 | 2/2002 | Hashimoto |
| 2002/0036617 A1 | 3/2002 | Pryor |
| 2002/0041327 A1 | 4/2002 | Hildreth et al. |
| 2002/0050979 A1 | 5/2002 | Oberoi et al. |
| 2002/0064382 A1 | 5/2002 | Hildreth et al. |
| 2002/0067922 A1 | 6/2002 | Harris |
| 2002/0075243 A1 | 6/2002 | Newton |
| 2002/0080123 A1 | 6/2002 | Kennedy et al. |
| 2002/0118177 A1 | 8/2002 | Newton |
| 2002/0145595 A1 | 10/2002 | Satoh |
| 2002/0163530 A1 | 11/2002 | Takakura et al. |
| 2003/0001825 A1 | 1/2003 | Omura et al. |
| 2003/0025951 A1 | 2/2003 | Pollard et al. |
| 2003/0043116 A1 | 3/2003 | Morrison et al. |
| 2003/0046401 A1 | 3/2003 | Abbott et al. |
| 2003/0063073 A1 | 4/2003 | Geaghan et al. |
| 2003/0071858 A1 | 4/2003 | Morohoshi |

| | | |
|---|---|---|
| 2003/0085871 A1 | 5/2003 | Ogawa |
| 2003/0095112 A1 | 5/2003 | Kawano et al. |
| 2003/0137494 A1 | 7/2003 | Tulbert |
| 2003/0142880 A1 | 7/2003 | Hyodo |
| 2003/0151532 A1 | 8/2003 | Chen et al. |
| 2003/0151562 A1 | 8/2003 | Kulas |
| 2003/0156118 A1 | 8/2003 | Ayinde |
| 2003/0161524 A1 | 8/2003 | King |
| 2003/0227492 A1 | 12/2003 | Wilde et al. |
| 2004/0001144 A1 | 1/2004 | McCharles et al. |
| 2004/0012573 A1 | 1/2004 | Morrison et al. |
| 2004/0021633 A1 | 2/2004 | Rajkowski |
| 2004/0031779 A1 | 2/2004 | Cahill et al. |
| 2004/0032401 A1 | 2/2004 | Nakazawa et al. |
| 2004/0046749 A1 | 3/2004 | Ikeda |
| 2004/0051709 A1 | 3/2004 | Ogawa et al. |
| 2004/0108990 A1 | 6/2004 | Lieberman |
| 2004/0125086 A1 | 7/2004 | Hagermoser et al. |
| 2004/0149892 A1 | 8/2004 | Akitt et al. |
| 2004/0150630 A1 | 8/2004 | Hinckley et al. |
| 2004/0169639 A1 | 9/2004 | Pate et al. |
| 2004/0178993 A1 | 9/2004 | Morrison et al. |
| 2004/0178997 A1 | 9/2004 | Gillespie et al. |
| 2004/0179001 A1 | 9/2004 | Morrison et al. |
| 2004/0189720 A1 | 9/2004 | Wilson et al. |
| 2004/0201575 A1 | 10/2004 | Morrison |
| 2004/0204129 A1 | 10/2004 | Payne et al. |
| 2004/0218479 A1 | 11/2004 | Iwamoto et al. |
| 2004/0221265 A1 | 11/2004 | Leung et al. |
| 2004/0233235 A1 | 11/2004 | Rubin et al. |
| 2004/0252091 A1 | 12/2004 | Ma et al. |
| 2005/0052427 A1 | 3/2005 | Wu et al. |
| 2005/0057524 A1 | 3/2005 | Hill et al. |
| 2005/0077452 A1 | 4/2005 | Morrison et al. |
| 2005/0083308 A1 | 4/2005 | Homer et al. |
| 2005/0104860 A1 | 5/2005 | McCreary et al. |
| 2005/0110964 A1 | 5/2005 | Bell |
| 2005/0122308 A1 | 6/2005 | Bell |
| 2005/0128190 A1 | 6/2005 | Ryynanen |
| 2005/0151733 A1 | 7/2005 | Sander et al. |
| 2005/0156900 A1 | 7/2005 | Hill et al. |
| 2005/0162381 A1 | 7/2005 | Bell |
| 2005/0183035 A1 | 8/2005 | Ringel et al. |
| 2005/0190162 A1 | 9/2005 | Newton |
| 2005/0241929 A1 | 11/2005 | Auger et al. |
| 2005/0243070 A1 | 11/2005 | Ung et al. |
| 2005/0248539 A1 | 11/2005 | Morrison et al. |
| 2005/0248540 A1 | 11/2005 | Newton |
| 2005/0270781 A1 | 12/2005 | Marks |
| 2005/0276448 A1 | 12/2005 | Pryor |
| 2006/0012579 A1 | 1/2006 | Sato |
| 2006/0022962 A1 | 2/2006 | Morrison et al. |
| 2006/0028456 A1 | 2/2006 | Kang |
| 2006/0034486 A1 | 2/2006 | Morrison et al. |
| 2006/0044282 A1 | 3/2006 | Pinhanez et al. |
| 2006/0114244 A1 | 6/2006 | Saxena et al. |
| 2006/0152500 A1 | 7/2006 | Weng |
| 2006/0158425 A1 | 7/2006 | Andrews et al. |
| 2006/0158437 A1 | 7/2006 | Blythe et al. |
| 2006/0170658 A1 | 8/2006 | Nakamura et al. |
| 2006/0197749 A1 | 9/2006 | Popovich |
| 2006/0202953 A1 | 9/2006 | Pryor et al. |
| 2006/0227120 A1 | 10/2006 | Eikman |
| 2006/0244734 A1 | 11/2006 | Hill et al. |
| 2006/0274067 A1 | 12/2006 | Hikai |
| 2006/0279558 A1 | 12/2006 | Van Delden et al. |
| 2007/0002028 A1 | 1/2007 | Morrison et al. |
| 2007/0019103 A1 | 1/2007 | Lieberman et al. |
| 2007/0046775 A1 | 3/2007 | Ferren et al. |
| 2007/0075648 A1 | 4/2007 | Blythe et al. |
| 2007/0075982 A1 | 4/2007 | Morrison et al. |
| 2007/0089915 A1 | 4/2007 | Ogawa et al. |
| 2007/0116333 A1 | 5/2007 | Dempski et al. |
| 2007/0126755 A1 | 6/2007 | Zhang et al. |
| 2007/0139932 A1 | 6/2007 | Sun et al. |
| 2007/0152984 A1 | 7/2007 | Ording et al. |
| 2007/0152986 A1 | 7/2007 | Ogawa et al. |
| 2007/0165007 A1 | 7/2007 | Morrison et al. |
| 2007/0167709 A1 | 7/2007 | Slayton et al. |
| 2007/0205994 A1 | 9/2007 | van Ieperen |
| 2007/0236454 A1 | 10/2007 | Ung et al. |
| 2007/0273842 A1 | 11/2007 | Morrison |
| 2008/0029691 A1 | 2/2008 | Han |
| 2008/0042999 A1 | 2/2008 | Martin |
| 2008/0055262 A1 | 3/2008 | Wu et al. |
| 2008/0055267 A1 | 3/2008 | Wu et al. |
| 2008/0062140 A1 | 3/2008 | Hotelling et al. |
| 2008/0062149 A1 | 3/2008 | Baruk |
| 2008/0068352 A1 | 3/2008 | Worthington et al. |
| 2008/0083602 A1 | 4/2008 | Auger et al. |
| 2008/0084539 A1 | 4/2008 | Daniel |
| 2008/0106706 A1 | 5/2008 | Holmgren et al. |
| 2008/0122803 A1 | 5/2008 | Izadi et al. |
| 2008/0129707 A1 | 6/2008 | Pryor |
| 2008/0150890 A1 | 6/2008 | Bell |
| 2008/0150913 A1 | 6/2008 | Bell |
| 2008/0179507 A2 | 7/2008 | Han |
| 2008/0234032 A1 | 9/2008 | de Courssou et al. |
| 2008/0259050 A1 | 10/2008 | Lin et al. |
| 2008/0259052 A1 | 10/2008 | Lin et al. |
| 2008/0278460 A1 | 11/2008 | Arnett et al. |
| 2009/0027357 A1 | 1/2009 | Morrison |
| 2009/0058832 A1 | 3/2009 | Newton |
| 2009/0058833 A1 | 3/2009 | Newton |
| 2009/0085881 A1 | 4/2009 | Keam |
| 2009/0103853 A1 | 4/2009 | Daniel |
| 2009/0109180 A1 | 4/2009 | Do et al. |
| 2009/0128499 A1 | 5/2009 | Izadi |
| 2009/0146972 A1 | 6/2009 | Morrison et al. |
| 2009/0153519 A1 | 6/2009 | Suarez Rovere |
| 2010/0001963 A1 | 1/2010 | Doray et al. |
| 2010/0020025 A1 | 1/2010 | Lemort et al. |
| 2010/0073326 A1 | 3/2010 | Keam |
| 2010/0079385 A1 | 4/2010 | Holmgren |
| 2010/0079409 A1 | 4/2010 | Sirotich et al. |
| 2010/0079493 A1 | 4/2010 | Tse et al. |
| 2010/0083109 A1 | 4/2010 | Tse et al. |
| 2010/0177049 A1 | 7/2010 | Levy |

FOREIGN PATENT DOCUMENTS

| | | |
|---|---|---|
| AU | 2006243730 A1 | 11/2006 |
| CA | 2058219 A1 | 4/1993 |
| CA | 2367864 A1 | 4/1993 |
| CA | 2219886 A1 | 4/1999 |
| CA | 2251221 A1 | 4/1999 |
| CA | 2267733 A1 | 10/1999 |
| CA | 2268208 A1 | 10/1999 |
| CA | 2252302 A1 | 4/2000 |
| CA | 2350152 A1 | 6/2001 |
| CA | 2412878 A1 | 1/2002 |
| CA | 2341918 A1 | 9/2002 |
| CA | 2386094 A1 | 12/2002 |
| CA | 2372868 A1 | 8/2003 |
| CA | 2390503 A1 | 12/2003 |
| CA | 2390506 A1 | 12/2003 |
| CA | 2432770 A1 | 12/2003 |
| CA | 2493236 A1 | 12/2003 |
| CA | 2448603 A1 | 5/2004 |
| CA | 2453873 A1 | 7/2004 |
| CA | 2460449 A1 | 9/2004 |
| CA | 2521418 A1 | 10/2004 |
| CA | 2481396 A1 | 3/2005 |
| CA | 2491582 A1 | 7/2005 |
| CA | 2563566 A1 | 11/2005 |
| CA | 2564262 A1 | 11/2005 |
| CA | 2501214 A1 | 9/2006 |
| CA | 2606863 A1 | 11/2006 |
| CA | 2580046 A1 | 9/2007 |
| CN | 1310126 C | 8/2001 |
| CN | 1784649 A | 6/2006 |
| CN | 101019096 A | 8/2007 |
| CN | 101023582 A | 8/2007 |
| CN | 1440539 A | 9/2009 |
| DE | 3836429 | 5/1990 |
| DE | 198 10 452 A1 | 12/1998 |
| DE | 60124549 | 9/2007 |
| EP | 125068 A2 | 11/1984 |
| EP | 0 279 652 A2 | 8/1988 |

| | | |
|---|---|---|
| EP | 0 347 725 A2 | 12/1989 |
| EP | 420335 | 4/1991 |
| EP | 0 657 841 A1 | 6/1995 |
| EP | 0 762 319 A2 | 3/1997 |
| EP | 0 829 798 A2 | 3/1998 |
| EP | 897161 A1 | 2/1999 |
| EP | 911721 A2 | 4/1999 |
| EP | 1059605 A2 | 12/2000 |
| EP | 1262909 A2 | 12/2002 |
| EP | 1739528 A1 | 1/2003 |
| EP | 1739529 A1 | 1/2003 |
| EP | 1315071 | 5/2003 |
| EP | 1420335 A2 | 5/2004 |
| EP | 1450243 A2 | 8/2004 |
| EP | 1457870 A2 | 9/2004 |
| EP | 1471459 A2 | 10/2004 |
| EP | 1517228 A2 | 3/2005 |
| EP | 1550940 A2 | 6/2005 |
| EP | 1611503 A0 | 1/2006 |
| EP | 1674977 A0 | 6/2006 |
| EP | 1 297 488 B1 | 11/2006 |
| EP | 1741186 A0 | 1/2007 |
| EP | 1766501 A0 | 3/2007 |
| EP | 1830248 A1 | 9/2007 |
| EP | 1876517 | 1/2008 |
| EP | 1877893 A0 | 1/2008 |
| ES | 2279823 T3 | 9/2007 |
| GB | 1575420 | 9/1980 |
| GB | 2176282 A | 5/1986 |
| GB | 2204126 A | 11/1988 |
| GB | 2263765 A | 8/1993 |
| GB | 2404127 | 1/2005 |
| JP | 57-211637 A | 12/1982 |
| JP | 61-196317 A | 8/1986 |
| JP | 61-260322 A | 11/1986 |
| JP | 62-005428 | 1/1987 |
| JP | 63-223819 | 9/1988 |
| JP | 3-054618 A | 3/1991 |
| JP | 3244017 | 10/1991 |
| JP | 4-350715 A | 12/1992 |
| JP | 4-355815 A | 12/1992 |
| JP | 5-181605 A | 7/1993 |
| JP | 5-189137 A | 7/1993 |
| JP | 5-197810 A | 8/1993 |
| JP | 6-110608 | 4/1994 |
| JP | 7-110733 A | 4/1995 |
| JP | 7-230352 A | 8/1995 |
| JP | 8-016931 B2 | 2/1996 |
| JP | 8-108689 A | 4/1996 |
| JP | 08-205113 | 8/1996 |
| JP | 8-240407 A | 9/1996 |
| JP | 8-315152 A | 11/1996 |
| JP | 9-091094 A | 4/1997 |
| JP | 9-224111 A | 8/1997 |
| JP | 9-319501 A | 12/1997 |
| JP | 10-105324 A | 4/1998 |
| JP | 11-051644 A | 2/1999 |
| JP | 11-064026 A | 3/1999 |
| JP | 11-085376 A | 3/1999 |
| JP | 11-110116 A | 4/1999 |
| JP | 11-203042 | 7/1999 |
| JP | 11-212692 | 8/1999 |
| JP | 2000-105671 A | 4/2000 |
| JP | 2000-132340 A | 5/2000 |
| JP | 2001-075735 A | 3/2001 |
| JP | 2001-142642 | 5/2001 |
| JP | 2001-282456 A | 10/2001 |
| JP | 2001-282457 A | 10/2001 |
| JP | 2002-055770 | 2/2002 |
| JP | 2002-236547 A | 8/2002 |
| JP | 2003-65716 A | 3/2003 |
| JP | 2003-158597 A | 5/2003 |
| JP | 2003-167669 A | 6/2003 |
| JP | 2003-173237 A | 6/2003 |
| JP | 2005-108211 A | 4/2005 |
| JP | 2005-182423 A | 7/2005 |
| JP | 2005-202950 A | 7/2005 |
| WO | 98/07112 A2 | 2/1998 |
| WO | 99/08897 A1 | 2/1999 |
| WO | 99/21122 A1 | 4/1999 |
| WO | 99/28812 A1 | 6/1999 |
| WO | 99/40562 A1 | 8/1999 |
| WO | 01/24157 A1 | 4/2001 |
| WO | 01/31570 A2 | 5/2001 |
| WO | 01/63550 A2 | 8/2001 |
| WO | 01/91043 A2 | 11/2001 |
| WO | 02/03316 A1 | 1/2002 |
| WO | 02/07073 A2 | 1/2002 |
| WO | 02/27461 A1 | 4/2002 |
| WO | 03/104887 A2 | 12/2003 |
| WO | 03/105074 A2 | 12/2003 |
| WO | 2004/072843 A1 | 8/2004 |
| WO | 2004/090706 A2 | 10/2004 |
| WO | WO 2004/090706 | 10/2004 |
| WO | 2004/102523 A1 | 11/2004 |
| WO | 2004/104810 A1 | 12/2004 |
| WO | 2005/031554 A1 | 4/2005 |
| WO | 2005034027 A1 | 4/2005 |
| WO | WO 2005/034027 | 4/2005 |
| WO | 2005/106775 A1 | 11/2005 |
| WO | 2005/107072 A1 | 11/2005 |
| WO | 2006/002544 A1 | 1/2006 |
| WO | 2006/092058 A1 | 9/2006 |
| WO | 2006/095320 A2 | 9/2006 |
| WO | 2006/096962 A1 | 9/2006 |
| WO | WO 2006/095320 | 9/2006 |
| WO | 2006/116869 A1 | 11/2006 |
| WO | 2007/003196 A2 | 1/2007 |
| WO | 2007/019600 A1 | 2/2007 |
| WO | 2007/037809 | 4/2007 |
| WO | 2007/064804 A1 | 6/2007 |
| WO | 2007/079590 | 7/2007 |
| WO | 2007/132033 A1 | 11/2007 |
| WO | 2007/134456 A1 | 11/2007 |
| WO | 2008/128096 A2 | 10/2008 |
| WO | 2009/029764 A1 | 3/2009 |
| WO | 2009/029767 A1 | 3/2009 |
| WO | 2009/146544 A1 | 12/2009 |
| WO | WO 2009/146544 | 12/2009 |
| WO | 2010/051633 A1 | 5/2010 |

OTHER PUBLICATIONS

International Search Report and Written Opinion for PCT/CA2004/001759 mailed Feb. 21, 2005 (7 Pages).
International Search Report for PCT/CA01/00980 mailed Oct. 22, 2001 (3 Pages).
International Search Report and Written Opinion for PCT/CA2009/000773 mailed Aug. 12, 2009 (11 Pages).
European Search Opinion for EP 07 25 0888 dated Jun. 22, 2007 (2 pages).
European Search Report for EP 07 25 0888 dated Jun. 22, 20067 (2 pages).
European Search Report for EP 06 01 9269 dated Nov. 9, 2006 (4 pages).
European Search Report for EP 06 01 9268 dated Nov. 9, 2006 (4 pages).
European Search Report for EP 04 25 1392 dated Jan. 11, 2007 (2 pages).
European Search Report for EP 02 25 3594 dated Dec. 14, 2005 (3 pages).
Partial European Search Report for EP 03 25 7166 dated May 19, 2006 (4 pages).
May 12, 2009 Office Action for Canadian Patent Application No. 2,412,878 (4 pages).
Förstner, Wolfgang, "On Estimating Rotations", Festschrift für Prof. Dr. -Ing. Heinrich Ebner Zum 60. Geburtstag, Herausg.: C. Heipke und H. Mayer, Lehrstuhl für Photogrammetrie und Fernerkundung, TU München, 1999, 12 pages. (http://www.ipb.uni-bonn.de/papers/#1999).
Funk, Bud K., CCD's in optical panels deliver high resolution, Electronic Design, Sep. 27, 1980, pp. 139-143.
Hartley, R. and Zisserman, A., "Multiple View Geometry in Computer Vision", Cambridge University Press, First published 2000, Reprinted (with corrections) 2001, pp. 70-73, 92-93, and 98-99.

Kanatani, K., "Camera Calibration", Geometric Computation for Machine Vision, Oxford Engineering Science Series, vol. 37, 1993, pp. 56-63.
Tapper, C.C., et al., "On-Line Handwriting Recognition—A Survey", Proceedings of the International Conference on Pattern Recognition (ICPR), Rome, Nov. 14-17, 1988, Washington, IEEE Comp. Soc. Press. US, vol. 2 Conf. 9, Nov. 14, 1988, pp. 1123-1132.
Wang, F., et al., "Stereo camera calibration without absolute world coordinate information", SPIE, vol. 2620, pp. 655-662, Jun. 14, 1995.
Wrobel, B., "minimum Solutions for Orientation", Calibration and Orientation of Cameras in Computer Vision, Springer Series in Information Sciences, vol. 34, 2001, pp. 28-33.
Press Release, "IntuiLab introduces IntuiFace, An interactive table and its application platform" Nov. 30, 2007.
Overview page for IntuiFace by IntuiLab, Copyright 2008.
NASA Small Business Innovation Research Program: Composite List of Projects 1983-1989, Aug. 1990.
*Touch Panel*, vol. 1 No. 1 (2005).
*Touch Panel*, vol. 1 No. 2 (2005).
*Touch Panel*, vol. 1 No. 3 (2006).
*Touch Panel*, vol. 1 No. 4 (2006).
*Touch Panel*, vol. 1 No. 5 (2006).
*Touch Panel*, vol. 1 No. 6 (2006).
*Touch Panel*, vol. 1 No. 7 (2006).
*Touch Panel*, vol. 1 No. 8 (2006).
*Touch Panel*, vol. 1 No. 9 (2006).
*Touch Panel*, vol. 1 No. 10 (2006).
*Touch Panel*, vol. 2 No. 1 (2006).
*Touch Panel*, vol. 2 No. 2 (2007).
*Touch Panel*, vol. 2 No. 3 (2007).
*Touch Panel*, vol. 2 No. 4 (2007).
*Touch Panel*, vol. 2 No. 5 (2007).
*Touch Panel*, vol. 2 No. 6 (2007).
*Touch Panel*, vol. 2 No. 7-8 (2008).
*Touch Panel*, vol. 2 No. 9-10 (2008).
*Touch Panel*, vol. 3 No. 1-2 (2008).
*Touch Panel*, vol. 3 No. 3-4 (2008).
*Touch Panel*, vol. 3 No. 5-6 (2009).
*Touch Panel*, vol. 3 No. 7-8 (2009).
*Touch Panel*, vol. 3 No. 9 (2009).
*Touch Panel*, vol. 4 No. 2-3 (2009).
Jul. 5, 2010 Office Action, with English translation, for Japanese Patent Application No. 2005-000268 (6 pages).
Villamor et al. "Touch Gesture Reference Guide", Apr. 15, 2010.
Notification of Transmittal Of The International Search Report And The Written Opinion Of The International Searching Authority for International Application No. PCT/CA2008/001350; the International Search Report; and the Written Opinion, mailed Oct. 17, 2008.
International Preliminary Report on Patentability, PCT/NZ2004/000029, May 20, 2005 (21 pages).
"International Preliminary Report on Patentability", PCT/US2008/060102, Oct. 22, 2009 (9 pages).
International Search Report for PCT/CA2010/001085 mailed Oct. 12, 2010 (5 pages).
"International Application Serial No. PCT/US2008/060102, Search Report & Written opinion mailed Feb. 12, 2009" (14 pages).
International Application Serial No. PCT/US2008/074749, Search Report & Written Opinion mailed Feb. 11, 2009 (10 pages).
"International Application Serial No. PCT/US2008/074755, International Search Report and Written Opinion mailed Jan. 29, 2009" (14 pages).
International Search Report for PCT/NZ05/00092 Sep. 27, 2006 (4 pages).
Loinaz et al., "A 200-mW, 3.3-V, CMOS Color Camera IC Producing 352x288 24-B Video at 30 Frames/s," IEEE Journal of Solid-StateCircuits,vol. 31,No. 12,Dec. 1998, pp. 2092-2103.
Yawcheng Lo, "Solid-state image sensor: technologies and applications," Input/Output and Imaging Technologies, Y.T. Tsai, T-M. Kung, and J. Larsen, eds. SPIE Proceedings vol. 3422, pp. 70-80 (1998).
*Touch Panel*, vol. 5 No. 2-3 (Sep. 2010).
*Touch Panel*, vol. 5 No. 4 (Nov. 2010).

"Store Window Presentations", Heddier Electronic.
"ThruGlass", Projected Capacitive Touchscreencs Specifications, Micro Touch.
Benko, et al., "Precise Selection Techniques for Multi-Touch Screens", Proc. ACM CHI 2006: Human Factors in Computer Systems, pp. 1263-1272.
Buxton, W., "Issues and Techniques in Touch-Sensitive Tablet Input," Computer Graphics, 19(3), Proceedings of SIGGRAPH '85, 1985, pp. 215-223.
VGA-format CMOS Camera-on-a-Chip For Multimedia Applications, Photobit Corporation, 1999 (2 pages).
Press Release Contact: Patricia Corsaut, "Intuilab introduces IntuiFace, An interactive table and its application platform", Nov. 30, 2007, Intuilab Press Release.
Jacob O. Wobbrock et al., "User-Defined Gestures for Surface Computing", CHI 2009, Apr. 4-9, 2009, Boston, Massachusetts, USA.
Martin Kaltenbrunner and Ross Bencina, "reacTIVision 1.4", Released May 19, 2009 (ReacTIVision 1.0 was released Nov. 29, 2005), retrieved from <http://reactivision.sourceforge.net/#usage> on Dec. 15, 2009.
Paul D'Intino, "How I Built ORION mt" May 11, 2008 taken from <http://orionmultitouch.blogspot.com/2008/05/how-i-built-orion-mt.html> on Nov. 23, 2009.
Touch Panel, vol. 5 No. 4 (Nov. 2010).
Touch Panel, vol. 5 No. 2-3 (Sep. 2010).
International Search Report and Written Opinion for PCT/CA2009/001357 dated Oct. 23, 2009.
International Search Report and Written Opinion for PCT/CA2009/001356 dated Jan. 4, 2010.
International Search Report and Written Opinion for PCT/CA2010/001085 mailed Oct. 12, 2010.
Douskos V., et al., "Fully Automatic Camera Calibration using Regular Planar Patterns", Laboratory of Photogrammetry, Department of Surveying, National Technical University of Athens (NTUA), GR-15780 Athens, Greece [online], Jun. 1, 2008; http://www.isprs.org/congresses/beijing2008/proceedings/5_pdf/04.pdf.
Douskos V., et al., "Fully Automatic of Digital Cameras Using Planar Chess-board Patterns", Department of Surveying, National Technical University of Athens (NTUA), GR-15780 Athens, Greece [online], May 1, 2007; http://www.survey.ntua.gr/main/labs/photo/staff/gkarras/Karras_O3DM_2007.pdf.
International Search Report and Written Opinion for PCT/CA2009/001358 dated Jan. 6, 2010.
International Search Report and Written opinion for PCT/CA2010/000002, dated Jun. 2, 2010.
International Search Report and Written Opinion for PCT/CA2009/001734 dated Feb. 23, 2010.
Hancock, M., et al. "Shallow-Depth 3D Interaction: Design and Evaluation of the One-, Two- and Three-Touch Techniques" In: CHI 2007, Proceedings of the SIGCHI Conference on Human Factors in Computing Systems, pp. 1147-1156, Apr. 28-May 3, 2007, San Jose, California.
Streitz, et al., "i-Land: an interactive landscape for creativity and innovation", Proceedings of CHI '99, 120-127.
Piper, et al. "SIDES: A Cooperative Tabletop Computer Game fo Social Skills Development", Proceedings of CSCW 2006, 1-10.
MacKenzie, "A note on the information theoretic basis for Fitts' Law", Journal of Motor Behavior, 21:323-330.
Hancock, et al. "Shallow-depth 3D interaction: design and evaluation of one-, two and three-touch techniques", In CHI '07: Proceedings of the SIGCHI Conference on Human Factos in Computing Systems, pp. 1147-1156. ACM, New York, NY USA.
Agarawal et al., "Keepin' it real: pushing the desktop metaphor with physics, piles, and the pen", in CHI '06: Proceedings of the SIGCHI Conference on Human Factors in Computing Systems, pp. 1283-1292. ACM, NY, NY, USA.
Balakrishnan et al. "Exploring bimanual camera control and object manipulation in 3D graphics interfaces." in CHI '99: Proceedings of the SIGCHI Conference on Human Factors in Computing Systems, pp. 56-62 (1999). ACM, New York, NY, USA.
Bers et al. "Interactive storytelling environments: coping with cardiac illness at Boston's Children's Hospital." In CHI '99: Proceedings of the SIGCHI Conference on Human Factors in Computing Systems, pp. 603-610 (1998). ACM Press/Addison-Wesley Publishing Co., New York, NY, USA.

Bradway "What is sandplay?" In Journal of Sandplay Therapy, vol. 15, No. 2, pp. 7-9 (2006).

Cao, et al. "Shapetouch: Leveraging contact shape on interactive surfaces." In TABLETOP 2008: 3rd IEEE International Workshop on Horizontal Interactive Human Computer Systems, pp. 129-136 (Oct. 2008).

Cassell, et al. "StoryMat: A playspace for collaborative storytelling." In CHI '99: Proceedings of the SIGCHI Conference on Human Factors in Computing Systems. ACM, New York, NY, USA (May 1999).

Cassell, et al. "Making space for voice: Technologies to support children's fantasy and storytelling." In Personal and Ubiquitous Computing, vol. 5, No. 3 (2001).

Davidson, et al. "Extending 2D object arrangement with pressure-sensitive layering cues." In UIST '08: Proceedings of the 21st annual ACM symposium on User Interface Software and Technology, pp. 87-90. ACM, New York, NY, USA (2008).

Dietz, et al. "DiamondTouch: a multi-user touch technology." In UIST '01: Proceedings of the 14th annual ACM symposium on User Interface Software and Technology, pp. 219-226. ACM, New York, NY, USA (2001).

Forlines, et al. "Under my finger: Human factors in pushing and rotating documents across the table." In Human-Computer Interaction—INTERACT 2005, vol. 3585, pp. 994-997. Springer Berlin / Heidelberg (2005).

Fröhlich, et al. "Physically-based manipulation on the Responsive Workbench." In IEEE Virtual Reality Conference 2000 (VR 2000), pp. 5-12 (Mar. 2000).

Gartner "Fast and robust smallest enclosing balls." in Proceedings of the 7th Annual European Symposium on Algorithms (ESA), pp. 325-338. Springer-Verlag (1999).

Garland, et al. "Surface simplification using quadric error metrics." In SIGGRAPH '97: Proceedings of the 24th annual conference on Computer graphics and interactive techniques, pp. 209-216. ACM Press/Addison-Wesley Publishing Co., New York, NY, USA (1997).

Michael Garland (1999). Quadric-based polygonal surface simplification. Ph.D. thesis, Carnegie Mellon University, Pittsburgh, PA, USA. Chair- Paul Heckbert.

Michael Garland (2004). "QSlim Simplification Software." Retrieved Mar. 4,2009, URL http://mgarland.org/software/qslim.html.

Grossman et al.(Oct. 2007). "Going deeper: a taxonomy of 3D on the tabletop." In TABLETOP '07: Second Annual IEEE International Workshop on Horizontal Interactive Human-Computer Systems, pp. 137-144.

Jefferson Y. Han (2005). "Low-cost multi-touch sensing through frustrated total internal reflection." In UIST '05: Proceedings of the 18th annual ACM symposium on User Interface Software and Technology, pp. 115-118. ACM, New York, NY, USA.

Hancock, et al. (2006). "Rotation and translation mechanisms for tabletop interaction." In TABLETOP 2006: First IEEE International Workshop on Horizontal Interactive Human-Computer Systems, pp. 79-88. IEEE Computer Society, Los Alamitos, CA, USA.

Hancock, et al. (2007). "Supporting multiple off-axis viewpoints at a tabletop display." In TABLETOP '07: Second International Workshop on Horizontal Interactive Human-Computer Systems, pp. 171-178. IEEE Computer Society, Los Alamitos, CA, USA.

Hancock, et al. (2007). "Shallow-depth 3D interaction: design and evaluation of one-, two and three-touch techniques." In CHI '07: Proceedings of the SIGCHI Conference on Human Factors in Computing Systems, pp. 1147-1156. ACM, New York, NY, USA.

Hilliges, et al.(Jul. 2007). "Designing for collaborative creative problem solving." In C&C '07: Proceedings of the 6th ACM SIGCHI Conference on Creativity & Cognition. ACM, New York, NY, USA.

Hoppe, et al. (1993). "Mesh optimization." In Computer Graphics, vol. 27, no. Annual Conference Series, pp. 19-26.

Hoppe (1996). "Progressive meshes." In Computer Graphics, vol. 30, no. Annual Conference Series, pp. 99-108.

Ishii, et al. (2004). "Bringing clay and sand into digital design—continuous tangible user interfaces." In BT Technology Journal, vol. 22, No. 4, pp. 287-299.

Jacob, et al. (1994). "Integrality and separability of input devices." In ACM Transactions on Computer-Human Interaction, vol. 1, No. 1, pp. 3-26.

Kal. "Introduction to sandplay therapy." Retrieved Apr. 11, 2009, URL http://www.sandplay.org/intro to sandplay therapy.htm.

Yuri Kravchik. "JPhysX." Retrieved Mar. 4, 2009, URL http://www.jphysx.com/.

Russell Kruger, Sheelagh Carpendale, Stacey D. Scott and Anthony Tang (2005). "Fluid integration of rotation and translation." In CHI '05: Proceedings of the SIGCHI Conference on Human Factors in Computing Systems, pp. 601-610. ACM, New York, NY, USA.

Yang Li, Ken Hinckley, Zhiwei Guan and James A. Landay (2005). "Experimental analysis of mode switching techniques in pen-based user interfaces." In CHI '05: Proceedings of the SIGCHI Conference on Human Factors in Computing Systems, pp. 461-470. ACM, New York, NY, USA.

Jun Liu, David Pinelle, Samer Sallam, Sriram Subramanian and Carl Gutwin (2006). "TNT: improved rotation and translation on digital tables." In GI '06: Proceedings of Graphics Interface 2006, pp. 25-32. Canadian Information Processing Society, Toronto, Ontario, Canada.

Microsoft Corporation. "Microsoft Surface." Retrieved Jan. 20, 2009, URL http://www.surface.com/.

NVIDIA Corporation. "NVIDIA PhysX." Retrieved Jan. 20, 2009, URL http://www.nvidia.com/object/nvidiaphysx.html.

"ARB vertex buffer object." Retrieved Mar. 4, 2009, URL http://www.opengl.org/registry/specs/ARB/vertex buffer object.txt.

Piper et al. (2008). "Supporting medical conversations between deaf and hearing individuals with tabletop displays." In CSCW '08: Proceedings of the 2008 ACM Conference on Computer Supported Cooperative Work, pp. 147-156. ACM, New York, NY, USA.

Jef Raskin (2000). The Humane Interface, chap. Meanings, Modes, Monotony and Myths. Addison-Wesley.

Adrian Reetz, Carl Gutwin, Tadeusz Stach, Miguel Nacenta and Sriram Subramanian (2006). "Superflick: a natural and efficient technique for long-distance object placement on digital tables." In GI '06: Proceedings of Graphics Interface 2006, pp. 163-170. Canadian Information Processing Society, Toronto, Ontario, Canada.

Kathy Ryall, Clifton Forlines, Chia Shen and Meredith Ringel Morris (2004). "Exploring the effects of group size and table size on interactions with tabletop shared-display groupware." In CSCW '04: Proceedings of the 2004 ACM Conference on Computer Supported Cooperative Work, pp. 284-293. ACM, New York, NY, USA.

Abigail J. Sellen, Gordon P. Kurtenbach and William A. S. Buxton (1992). "The prevention of mode errors through sensory feedback." In Human-Computer Interaction, vol. 7, No. 2, pp. 141-164.

"Simplified Wrapper and Interface Generator." Retrieved Mar. 4, 2009, URL http://www.swig.org/.

Lucia Terrenghi, David Kirk, Abigail Sellen and Shahram Izadi (2007)." Affordances for manipulation of physical versus digital media on interactive surfaces." In CHI '07: Proceedings of the SIGCHI Conference on Human Factors in Computing Systems, pp. 1157-1166. ACM, New York, NY, USA.

Greg Turk (1992). "Re-tiling polygonal surfaces." In SIGGRAPH Computer. Graph., vol. 26, No. 2, pp. 55-64.

Kristina Walter (2008). "Sand Play Therapy / Sandspieltherapie nach Dora M. Kal." Retrieved Apr. 11, 2009 (public domain), URL http://commons.wikimedia.org/wiki/File:Sandspiell.jpg.

Yao Wang, Assaf Biderman, Ben Piper, Carlo Ratti and Hiroshi Ishii. "Sandscape." Retrieved Jan. 20, 2009, URL http://tangible.media.mit.edu/projects/sandscape/.

Lance Williams (1978). "Casting curved shadows on curved surfaces." In SIGGRAPH Computer. Graph., vol. 12, No. 3, pp. 270-274.

Andrew D. Wilson, Shahram Izadi, Otmar Hilliges, Armando Garcia-Mendoza and David Kirk (2008). "Bringing physics to the surface." In UIST '08: Proceedings of the 21st annual ACM symposium on User Interface Software and Technology, pp. 67-76. ACM, New York, NY, USA.

Jacob O. Wobbrock, Andrew D. Wilson and Yang Li (2007). "Gestures without libraries, toolkits or training: a $1 recognizer for user interface prototypes." In UIST '07: Proceedings of the 20th annual ACM symposium on User Interface Software and Technology, pp. 159-168. ACM, New York, NY, USA.

Mike Wu and Ravin Balakrishnan (2003). "Multi-finger and whole hand gestural interaction techniques for multi-user tabletop displays." In UIST '03: Proceedings of the 16th annual ACM symposium on User Interface Software and Technology, pp. 193-202. ACM, New York, NY, USA.

Zagal, et al. (2004). "Kids telling fables through 3D animation." GVU Technical Report 23, Georgia Institute of Technology. URL http://hdl.handle.net/1853/3732.

Zagal, et al. (2006). "Social and technical factors contributing to successful 3D animation authoring by kids." GVU Technical Report 14, Georgia Institute of Technology. URL http://hdl.handle.net/1853/13120.

"White Paper", Digital Vision Touch Technology, Feb. 2003.

* cited by examiner

SYSTEM AND METHOD OF DETECTING CONTACT ON A DISPLAY

FIELD OF THE INVENTION

The present invention relates generally to display screens, and in particular, to a system and method for detecting contact on such display screens.

BACKGROUND OF THE INVENTION

Touch systems are well known in the art and typically include a touch screen having a touch surface on which contacts are made using a pointer. Pointer contacts with the touch surface are detected and are used to generate corresponding output pointer position data representing areas of the touch surface where the pointer contacts are made. There are basically two general types of touch systems available and they can be broadly classified as "active" touch systems and "passive" touch systems.

Active touch systems allow a user to generate pointer position data by contacting the touch surface with a special pointer that usually requires some form of on-board power source, typically batteries. The special pointer emits signals such as infrared light, visible light, ultrasonic frequencies, electromagnetic frequencies, etc. that activate the touch surface.

Passive touch systems allow a user to generate pointer position data by contacting the touch surface with a passive pointer and do not require the use of special pointers in order to activate the touch surface. A passive pointer can be a finger, a cylinder of some material, or any other suitable object that can be used to contact some predetermined area of interest on the touch surface. Since special active pointers are not necessary in passive touch systems, battery power levels and/or pointer damage, theft, or pointer misplacement are of no concern to users. The detection of one or more points of contact with the touch screen or other display surfaces may be accomplished by a myriad of techniques.

United States Patent Application No. 20060279558 to Van Delden et al. discloses a display device having a touch screen 301. The touch screen comprises a first light guide 302, a second light guide 307, and a media 309 between the light guides for eliminating interference and reflections. A light source 308 is arranged to emit light 310 into the first light guide 302, where the light is normally confined within the first light guide by means of total internal reflections. The second light guide 307 is arranged at the exterior face of the first light guide 302. When a user of the display device establishes physical contact with the touch screen 301, light is extracted from the first light guide and directed towards light detecting means 303. The light detecting means 303 are arranged for relating a light detecting event to an input position on the touch screen 301, where user interaction occurred.

United States Patent Application No. 20060114244 to Saxena et al. discloses a touch input system including a light-emitting device, a bent light guide, and a light detector, whereby the light-emitting device emits light. The bent light guide receives the light emitted by the light-emitting device and guides the light to travel in a direction across a face of a display screen, where light detector detects the light. When an object interrupts transmission of light, the interruption is detected by an activated light detector opposite the light emitter transmitting light. This is illustrated by an object 17 interrupting light transmitted from one of light emitters 10 to light detectors 11, and interrupting light transmitted from one of light emitters 12 to light detectors 14.

United States Patent Application No. 20050104860 to McCreary et al. discloses a touchframe system including a plurality of light emitting elements and a plurality of light receiving elements positioned around the perimeter of a display area. Each of the light receiving elements in combination with a plurality of the light emitting elements form a zone of light beam paths. The number and positioning of receivers is sufficient to form a plurality of partially overlapping zone pairs. These zone pairs are arranged relative to the display area such that any touch event lies within at least two zone pairs. A processor monitors each of the zone pairs for blockage of at least one light beam path. Upon such blockage, the processor calculates the location of the touch event associated with the blockage based on the slopes and end points of at least two intersecting blocked light beam paths from a first zone pair and two intersecting blocked light beam paths from a second zone pair.

United States Patent Application No. 20040032401 to Nakazawa et al. discloses a substrate made of glass that serves both as a substrate for a touch panel and a front light. The substrate includes both the function of propagating an ultrasonic wave in order to detect a touched position, and propagating light emitted from a light source to guide the light toward a reflective-type liquid crystal display. In the case where an image on the liquid crystal display is made visible by external light, the external light that is transmitted through the substrate is reflected by the liquid crystal display and transmitted through the substrate to be emitted from the front face. In the case where the front light function is used, light which has been introduced into the substrate from the light source is reflected by the liquid crystal display and transmitted through the substrate to be emitted from the front face.

U.S. Pat. No. 7,002,555 to Jacobsen et al. discloses a display device having a touch sensor that consists of an electrochromic cell or a liquid crystal cell that is located between two transparent plates, a transparent cover plate, and a transparent support plate. A radiation source whose light enters the cover plate and illuminates it is arranged on at least one of the end faces of the transparent cover plate. At least one photodetector is mounted on the support plate.

U.S. Pat. No. 6,738,051 to Boyd et al. discloses a frontlit touch panel for use with a reflective light valve, where the panel comprises a front light guide having at least one light input face that supplies light to the guide, a viewing face, a light output face opposite the viewing face, and at least one component of a touch-sensitive transducer. The light output face includes a light extraction layer thereon having a substantially flat light exit face and contains buried reflective facets that extract supplied light from the guide through the light exit face. The touch panel can be used with a light source, a reflective light valve, and suitable control electronics to form a compact and efficient illuminated touch panel display assembly.

U.S. Pat. No. 4,710,760 to Kasday discloses a touch-sensitive device comprising a photoelastic screen having light reflecting edges and a unique light emitting/receiving module placed at two of the four corners of the screen, which advantageously determines the location at which a force is applied to the screen. Circularly and linearly polarized light focused into the photoelastic screen by the modules reflects off the edges of the screen and is returned to the modules where it is absorbed by a circular polarizer. The polarization of light passing through a point at which the screen is touched is changed thereby allowing these rays or signals to pass through each module's absorber. The location as well as the magnitude and direction of the force imparted to the screen by the touch is then determined from the changes in the signals that pass through the absorber.

It is therefore at least one object of the present invention to provide a novel system and method of detecting contact on a display screen.

SUMMARY OF THE INVENTION

These and other objects may be accomplished according to one or more embodiments, whereby a system for detecting contact on a display is provided. The system for detecting contact comprises a planar medium associated with the display and includes at least one edge facet and opposing surfaces. The system also includes one or more optical sources operatively coupled to the edge facet for transmitting an optical signal into the planar medium such that the transmitted optical signal is totally internally reflected between the at least one edge facet and opposing surfaces. According to the system, an optical sensing device is positioned to substantially face at least a portion of the edge facet and adapted to detect at least one object contacting a first surface of the opposing surfaces. The optical sensing device is operative to detect a portion of the optical signal emitted from the first surface at a location corresponding to the object contacting the first surface.

According to another embodiment, a system for detecting contact on a display is provided, where the system comprises a planar medium associated with the display and includes at least one edge facet and opposing surfaces. The system also includes one or more optical sources operatively coupled to the edge facet for transmitting an optical signal into the planar medium such that the transmitted optical signal is totally internally reflected between the at least one edge facet and opposing surfaces. Further, according to the system, at least two camera devices are provided, where the camera devices are positioned to substantially face at least a portion of the edge facet and adapted to detect at least one object contacting a first surface of the opposing surfaces. The camera devices are operative to capture images of a portion of the optical signal emitted from the first surface at a location corresponding to the object contacting the first surface.

According to yet another embodiment, a method of detecting contact to a display is provided. The method of detecting contact to a display comprises transmitting an optical signal into a planar medium associated with the display, where within the planar medium the transmitted optical signal is totally internally reflected. An optical sensing device is positioned to substantially face a side location associated with the planar medium and a surface location on the first surface is contacted using at least one object. Using the optical sensing device, a portion of the optical signal emitted from the surface location is detected based on the object contacting the surface location.

Further, according to an embodiment, a method of detecting contact to a display is provided, where the method comprises transmitting an optical signal into a planar medium associated with the display, where within the planar medium the transmitted optical signal is totally internally reflected. The method also includes positioning a first camera device to substantially face a first side location associated with the planar medium, where the first camera device receives images from a first surface of the planar medium. A second camera device is positioned to substantially face a second side location associated with the planar medium, where the second camera device receives images from the first surface of the planar medium. A surface location on the first surface is contacted using at least one object, whereby using the first and second camera, images of a portion of the optical signal emitted from the surface location based on the object contacting the surface location are captured.

Also, in another embodiment, a passive touch system comprises a touch screen having opposing surfaces that are adapted to receive an optical signal that is totally internally reflected within the opposing surfaces. Upon an object contacting a surface location associated with the opposing surfaces, a portion of the optical signal is emitted from the surface location. At least two cameras are associated with the touch surface and positioned substantially at a side location to the touch surface. At the surface location, images of the portion of the optical signal emitted from the surface location are captured by the two cameras for determining a coordinate position associated with the object contacting the surface location.

BRIEF DESCRIPTION OF THE DRAWINGS

One or more embodiments will now be described more fully with reference to the accompanying drawings in which.

DETAILED DESCRIPTION OF THE PREFERRED EMBODIMENT

In the following description, an embodiment of a system and method for detecting contact from, for example, a user's finger, a cylindrical hand-held object, or any other capable means on a display screen such as a touch screen used in media presentation systems is provided.

Figure 1A:
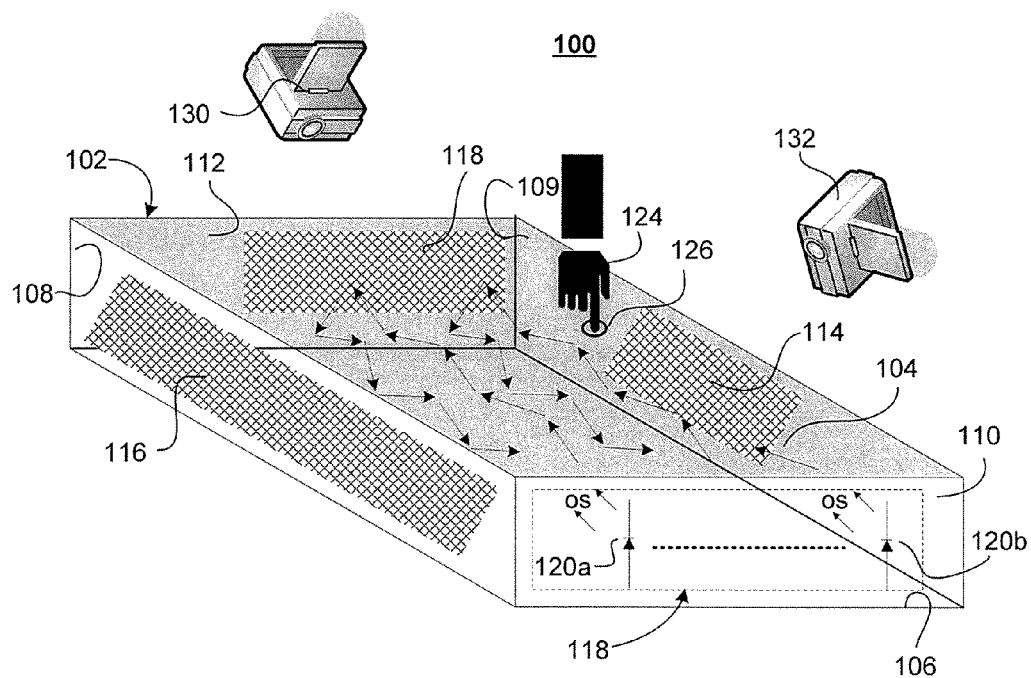
FIG. 1A is a system for detecting contact on a display according to one embodiment.

Turning now to FIG. 1A, a system 100 for detecting contact on a display includes a planar shaped medium 102, an optical source 118, and at least one optical sensing device such as camera devices 130 and 132.

The planar shaped medium 102 may be adapted to conform to the shape of a display screen (not shown) or alternatively form an integral part of the outer-surface of a display screen. In either aspect, the planar shaped medium 102 is utilized to receive contact directly (e.g., via a finger) or indirectly (e.g., via a pen-shaped or any other object) from a user. Planar shaped medium 102 includes opposing surfaces such as top-surface 104 and bottom-surface 106. The planar shaped medium 102 also includes peripheral edge facets such as opposing edge facets 108 and 109, and opposing edge facets 110 and 112. The outer surfaces of opposing edge facets 108 and 109 and edge facet 112 are covered with an optically reflective material such as copper or silver tape. Alternatively, reflective materials may be deposited directly onto the outer surfaces of the side opposing facets 108, 109 and end facet 112 using known deposition, adhesion, or bonding techniques. As illustrated, edge facet 108 includes reflective surface 116, edge facet 109 includes reflective surface 114, and edge facet 112 includes reflective surface 118.

Edge facet 110 is adapted to receive an optical signal from the optical source 118, whereby the optical source 118 may be coupled either directly to the edge facet 110 using a surface mountable optical device (e.g., surface emitting light emitting diodes) or via an intermediate optical mechanism (e.g., an optical fiber, a lens assembly, optical filters, an optical diffuser, etc.). The planar shaped medium 102 is constructed from a material capable of exhibiting optical wave-guiding properties such as an acrylic material having fire polished edges. Other materials such as glass may also be used to form planar shaped medium 102. Although optical source 118 is coupled to edge facet 110, other optical sources (not shown) may also be adapted to transmit optical signals into the planar shaped medium 102 via one more of the other facets. For example, additional optical sources (not shown) may be coupled to facets 108, 109, and/or 112. The addition of other optical sources (not shown) reduces the reflectivity requirements exhibited by reflective surfaces 114, 116, and 118. For example, when an optical source is coupled to each of facets 108, 109, 110, and 112, the incorporation of reflective surfaces on the facets is no longer a necessity and may be optional. According to another example, optical sources may each be coupled to facets 110 and 108. In such an embodiment, edge facets 112 and 109 may include reflective surfaces that reflect any optical signals transmitted from the optical sources that are coupled to facets 110 and 108, respectively.

Optical source 118 may include one or more spatially distributed light emitting diodes such LED device 120*a* and LED device 120*b*. Light emitting diodes 120*a*-120*b* may include a viewing half angle in the range of 0-90 degrees. The number of utilized LED devices may depend on the required optical power relative to the spatial distribution of the incident optical signal transmitted into the planar shaped medium 102. These factors may in turn depend on the geometric size of the planar shaped medium 102 and the attenuation properties of the material forming the planar shaped medium 102. For example, glass may exhibit less attenuation on a transmitted optical signal relative to plastic. Other optical sources such as one or more laser devices (e.g., FP laser diodes, DFB laser diodes, VCSEL devices, etc.) may also be used for transmitting optical signals into planar shaped medium 102.

The optical output signals provided by optical source 118 may include a wide range of wavelengths such as infrared, visible light, as well as ultraviolet. For example, the use of certain visible wavelengths may create various visual effects with respect to a planar shaped medium incorporated as a display screen. In one scenario, for example, multiple presentation screens may be set-up during a conference. The different presentation screens may then be color coded by transmitting different visible light signals into each display screen (i.e., via the planar medium) using different wavelength optical sources (e.g., red LED, blue LED, etc.). In another scenario, for example, no visual effect may be desired. Accordingly, an optical source operating in the infrared range is employed for signal transmission into the planar shaped medium 102.

According to one aspect, optical sensing devices such as camera devices 130 and 132 may include CMOS based camera sensors, which allow for the processing of a subset of available pixels as opposed to the collection of every pixel. This reduces the processing overhead while increasing the frame rate (fps) capabilities. Each of the camera devices 130, 132 is positioned to substantially face one of the edge facets and adapted to capture images of an object 124 (e.g., a user's finger) contacting a location 126 on the top-surface of the planar shaped medium 102. For example, camera 132 may be positioned to fully or partially face edge facet 109, while capturing images from top-surface 104. Similarly, camera 130 may be positioned to fully or partially face opposing edge facet 112, while also capturing images from top-surface 104. In an alternative example, camera 132 may be positioned to fully or partially face opposing edge facet 108, while capturing images from top-surface 104. The field of view of cameras 130 and 132 overlap and cover the top-surface 104 of the planar medium 102 in order to facilitate both the detection and position determination of an applied contact location on the top-surface 104. According to another aspect, the optical sensing device may include a photodetector device (not shown) such as a photodiode. As with the camera devices 130, 132, the photodetector may also be positioned to substantially face one of the opposing edge facets and adapted to detect the object 124 (e.g., a user's finger) contacting a region such as location 126 on the top-surface of the planar shaped medium 102.

Figure 1B:
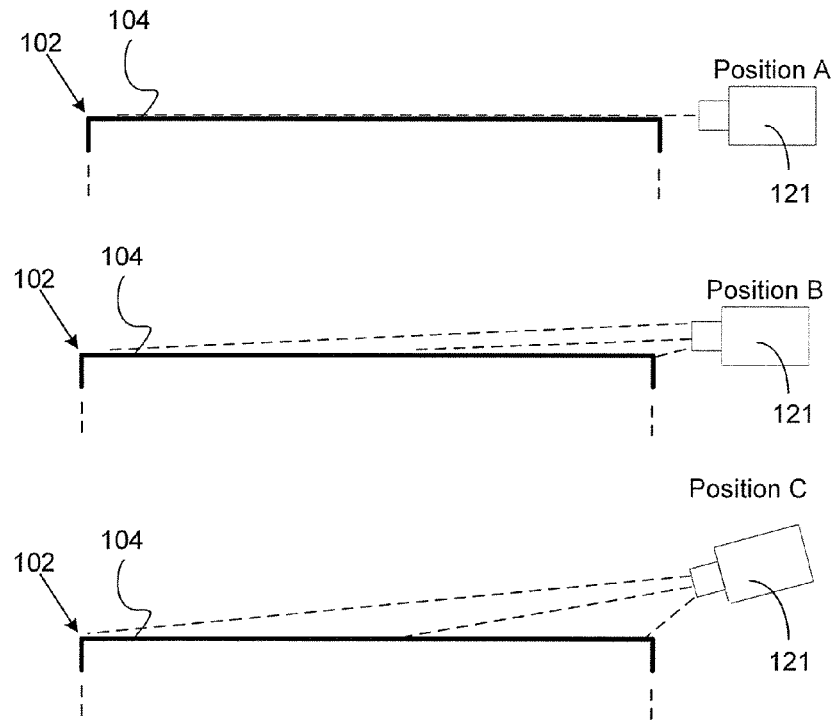
FIG. 1B is a cross-sectional view illustrating the position of an optical sensing device relative to the surface of a planar shaped medium associated with the embodiment of FIG. 1A.
Figure 6:
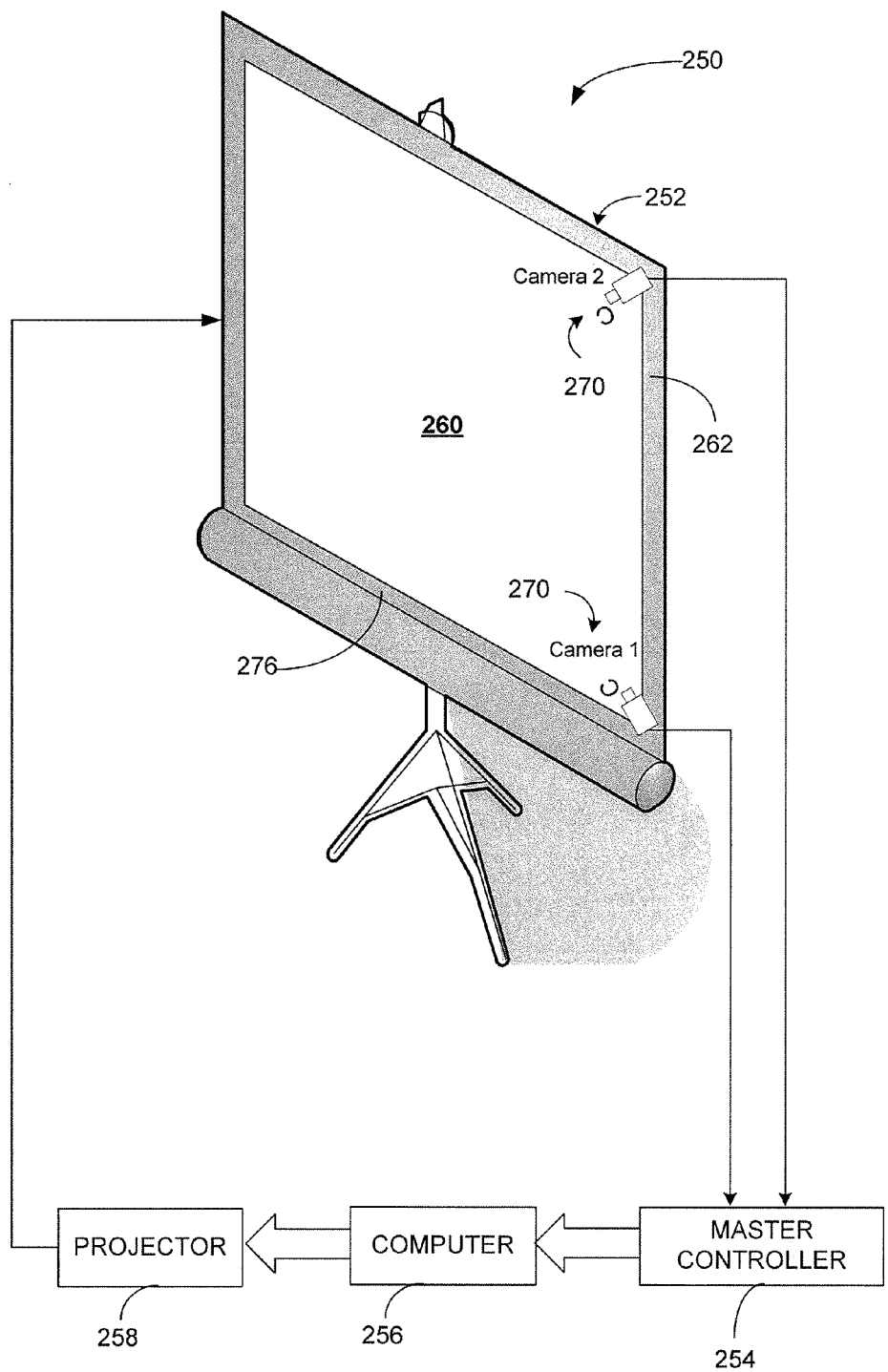
FIG. 6 is a schematic diagram of a camera-based touch system adapted to incorporate the system of FIG. 1A.
Figure 7:
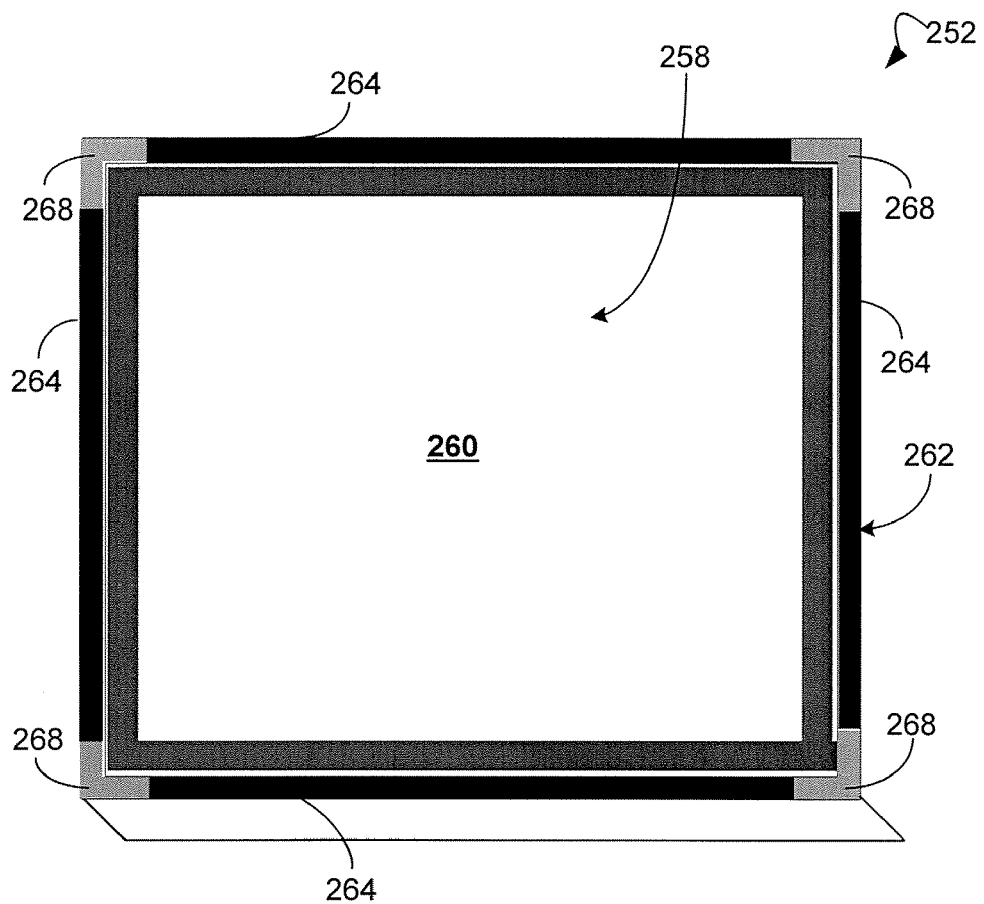
FIG. 7 is a front elevation view of a touch screen forming part of the touch system of FIG. 6.

The position of cameras 130 and 132 relative to top-surface 104 are arranged in a manner that enables the capture of images from the top-surface 104. As illustrated in FIG. 1B, an optical sensing device 121 such as one or more camera devices or photodetectors may be positioned according to a multitude of positions while still capturing the images from top-surface 104. For example, the "position A" device 121 is positioned (i.e., relative to an axis going through the center of a camera lens or photodetector photosensitive area) to be substantially aligned with the top-surface 104 of planar medium 102. The "position B" and "position C" devices 121 are positioned (i.e., relative to an axis going through the center of a camera lens or photodetector photosensitive area) to be substantially elevated relative to the top-surface 104 of planar medium 102. In both cases, however, the device 121 is capturing images from the side of the planar medium 102. Since the planar medium 102 may, for example, form the outer surface of a display such as a plasma or LCD screen, the side-looking positioning of the device 121 does not interfere or obstruct any projection means used by the plasma or LCD technology in generating images on the corresponding plasma or LCD displays. For example, as illustrated in FIGS. 6 and 7, camera devices 270 (FIG. 6) may be installed in one of the corners 268 of display frame 262. Alternatively, for example the cameras 270 may be positioned along any portion of the frame between corners 268.

Figure 2A:
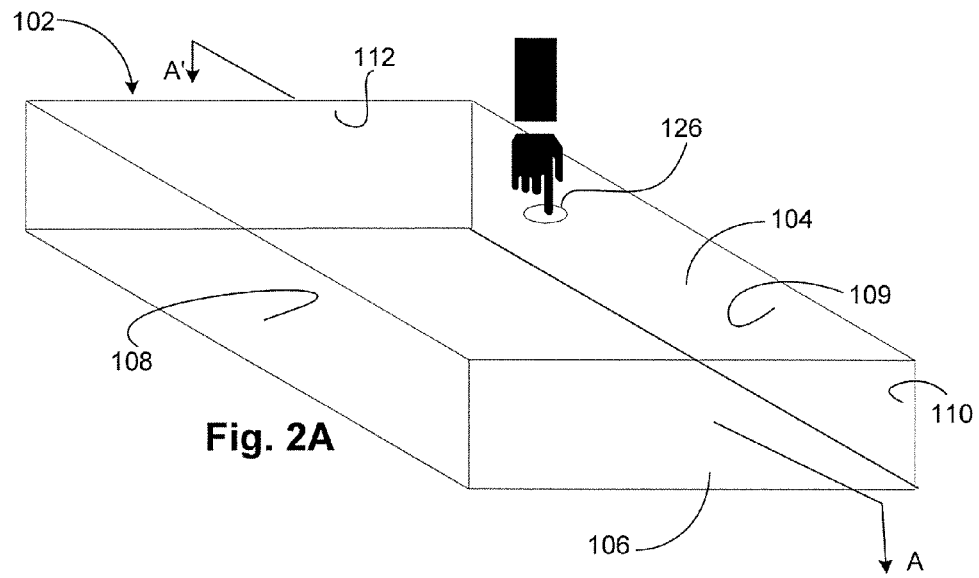
FIGS. 2A-2C illustrate the concept of detecting contact to a planar shaped medium according to the embodiment of FIG. 1A.
Figure 2B:
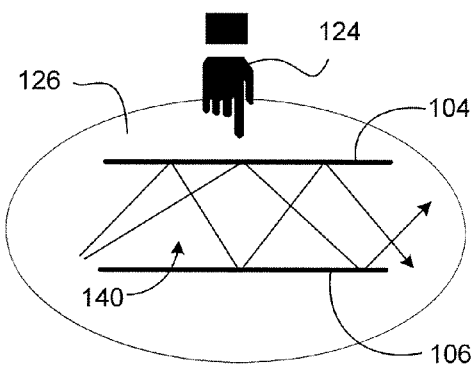
Figure 2C:
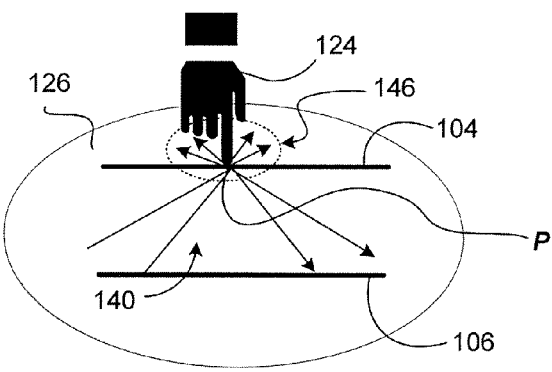

Turning now to FIGS. 2A-2C, the concept of detecting contact to a display according to an embodiment such as the embodiment of system 100 (FIG. 1A) is illustrated. As illustrated in FIG. 2A, a user may apply contact to a location 126 on the top-surface 104 of the planar shaped medium 102. The effect of such a contact is now illustrated with the aid of FIGS. 2B and 2C. FIGS. 2B and 2C show a cross-sectional view along axis A-A' of a region 126 of the planar shaped medium 102 of FIG. 2A. Referring to FIG. 2B, an optical signal 140 generated from source 118 (FIG. 1A) is totally internally reflected between opposing surfaces 104 and 106, and the peripheral edge facets 108, 109, 112 (FIG. 2A). Referring to FIG. 2C, as a user 124 applies a contact to top-surface 104, a portion 146 of the optical signal 140 that is totally internally reflected between the opposing surfaces 104,106 and peripheral edge facets 108, 109, 112 (FIG. 2A) is emitted from the top-surface. Based on the user applying the contact to the top-surface, a refractive index change is generated at the point of contact P, which causes the totally reflected optical signal 140 to be frustrated at the contact point P. Thus, the Frustrated Total Internal Reflection (FTIR) phenomenon at the boundary between the point of contact and the top-surface 104 facilitates the detection of the portion 146 of the internally reflected optical signal 140 emitted from the top-surface 104 by any suitable optical sensing device such as a cameras or optical sensing device that is directed at the top-surface 104 of the planar shaped medium 102 (FIG. 2A).

The use of a suitable optical sensing device may depend on the application of the system and methods described herein. For example, the use of one or more cameras provides the capability of both detecting the point or points of contact with the top-surface 104 and locating the position of the point of contact with the top-surface 104 using further image processing techniques. Alternatively, for example, a photodetector device may be utilized to detect the presence of the emitted portion of light 146, therefore, signifying that contact with the top-surface 104 has been made.

Figure 3A:
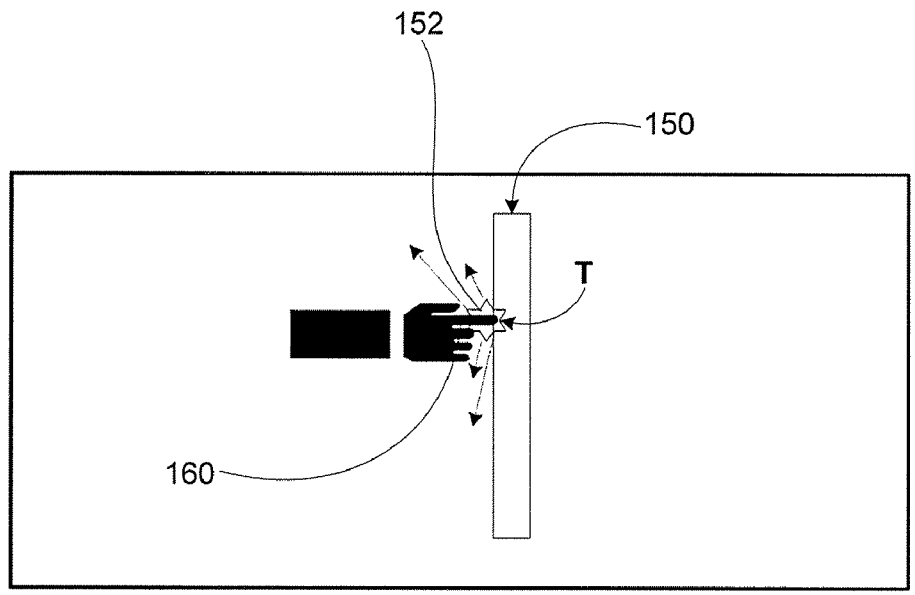
FIGS. 3A-3B are photographic illustrations of contact detection on a planar shaped medium constituting a display.
Figure 3B:
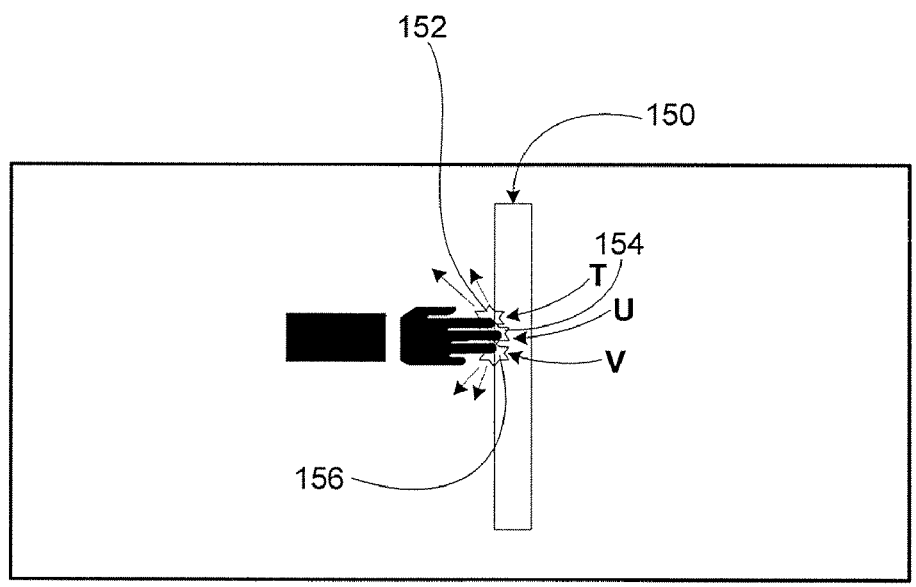

Referring now to FIGS. 3A and 3B, photographic illustrations of captured images by a camera device of points of contact with a top-surface of a screen 150 are illustrated. In FIG. 3A, a user's finger 160 is used to contact the top-surface of the screen 150 incorporating a similar embodiment to that of system 100 (FIG. 1A). As illustrated, an emitted frustrated optical signal manifested as an illuminated region 152 is captured by the camera device at the point of contact T. Similarly, as depicted in FIG. 3B, the camera captures a user's fingers applying multiple contact points to the top-surface 150 and thus causing the emission of multiple frustrated optical signals manifested as illuminated regions 152, 154, 156 at contact points T, U, and V, respectively.

Figure 4:
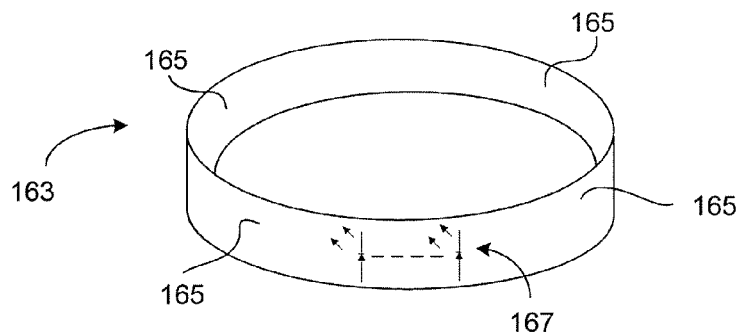
FIG. 4 illustrates an alternative embodiment of a planar shaped medium associated with the described system.

Turning now to FIG. 4, an alternative embodiment of a planar shaped medium 163 is illustrated. As shown in FIG. 1A, the planar shaped medium 102 is rectangular shaped and therefore includes four flat-faced edge facets. In the alternative embodiment shown in FIG. 4, a planar shaped medium 163 having a single edge facet 165 is provided by utilizing an elliptical or circular shaped planar medium. The surfaces of edge facet 165 may be partially or completely covered by an optically reflective material for facilitating the reflectivity of an optical signal transmitted by optical source 167 into the planar shaped medium 163.

Figure 5A:
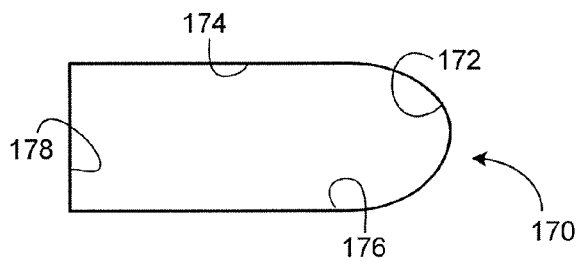
FIGS. 5A-5C illustrate other alternative embodiments of a planar shaped medium associated with described system.
Figure 5B:
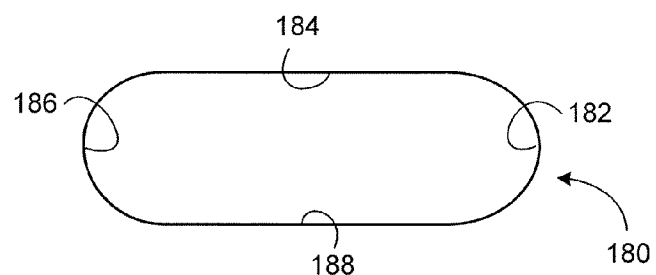
Figure 5C:
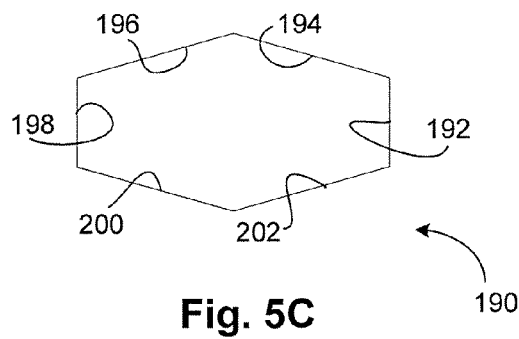

Other shaped planar media may also be utilized within system 100 (FIG. 1A), as depicted in FIGS. 5A-5C. Referring to FIG. 5A, planar shaped medium 170 includes flat faced edge facets 174, 176, 178 and a curve shaped edge facet 172. One or more optical sources may be coupled to any one or more of edge facets 172-178. Moreover, any one of the surfaces of edge facets 172-178 may be covered by an optically reflective surface. In FIG. 5B, planar shaped medium 180 includes opposing flat faced edge facets 184, 188 and opposing curve shaped edge facets 182, 186. One or more optical sources may be coupled to any one or more of edge facets 182-188. Also, any one of the surfaces of edge facets 182-188 may be covered by an optically reflective surface. Turning now to FIG. 5C, planar shaped medium 190 includes multi-sided flat faced edge facets 192-202, where one or more optical sources may be coupled to any one or more of the multi-sided flat faced edge facets 192-202. Any one of the surfaces of multi-sided flat faced edge facets 172-178 may also be covered by an optically reflective surface. As previously described in relation to FIG. 1A, the outer surfaces of the edge facets associated with FIGS. 4 and 5A-5C may be covered with an optically reflective material such as copper or silver tape. Alternatively, reflective materials may be deposited directly onto these outer surfaces using known deposition, adhesion, or bonding techniques.

The exemplary embodiments described in relation to FIGS. 4 and 5A-5C illustrate that a multitude of shapes may be adopted as a planar shaped medium. The allocation of a particular shape to a planar shaped medium may depend on, but is not limited to, aesthetic considerations, the shape of a display screen to which the planar shaped medium may be coupled to, the required size of the planar shaped medium, reflectivity considerations, optical source considerations, and other factors.

The foregoing embodiment for detecting contact on a planar shaped medium such as a display screen will now be explained in association with an exemplary media presentation system. Turning now to FIG. 6, an exemplary media presentation system such as camera-based touch system 250 is provided, as disclosed in U.S. Pat. No. 6,803,906 to Morrison et al. and assigned to the assignee of the subject application, the content of which is incorporated by reference herein in its entirety.

As illustrated in FIG. 6, a passive touch system 250 includes a touch screen 252 coupled to a master controller 254, whereby the master controller 254 is also coupled to a computer 256. Computer 256 executes one or more application programs and generates a display that is projected onto the touch screen 252 via a projector 258. The touch screen 252, master controller 254, computer 256 and projector 258 form a closed-loop so that user-contacts with the touch screen 252 can be recorded as writing or drawing, or used to control execution of application programs executed by the computer 256.

FIG. 7 better illustrates the touch screen 252. As shown in FIG. 6, touch screen 252 includes a touch surface 260 bordered by a frame 262. Touch surface 260 is passive and is in the form of a rectangular planar sheet of material such as the planar shaped medium 102 (FIG. 1A) described above. Referring to FIG. 7, each camera subsystem includes a camera system (not shown) mounted adjacent a different corner 268 of the touch screen 252 by a frame assembly 264. Each frame assembly 264 may include an angled support plate (not shown) on which the camera system is mounted.

Figure 8:
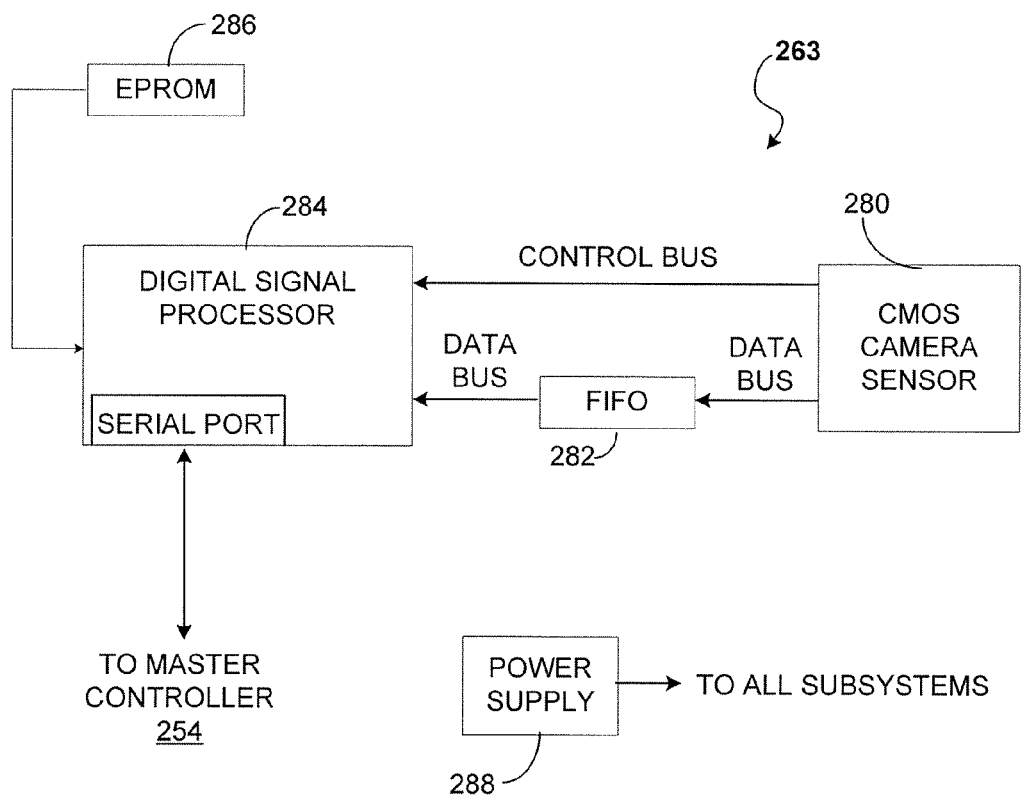
FIG. 8 is a schematic diagram of a camera system forming part of the touch system of FIG. 6.

Referring to FIG. 8, each camera system 263 may include a two-dimensional CMOS camera image sensor and associated lens assembly 280, a first-in-first-out (FIFO) buffer 282 coupled to the image sensor and lens assembly 280 by a data bus, and a digital signal processor (DSP) 284 coupled to the FIFO 282 by a data bus and to the image sensor and lens assembly 280 by a control bus. A boot EPROM 286 and a power supply subsystem 288 are also included.

The CMOS camera image sensor may include is a Photobit PB300 image sensor configured for a 20×640 pixel sub-array that can be operated to capture image frames at rates in excess of 200 frames per second. For example, the FIFO buffer 282 and DSP 284 may both be manufactured by Cypress under part number CY7C4211V and Analog Devices under part number ADSP2185M, respectively.

The DSP 284 provides control information to the image sensor and lens assembly 280 via the control bus. The control information allows the DSP 284 to control parameters of the image sensor and lens assembly 280 such as exposure, gain, array configuration, reset and initialization. The DSP 284 also provides clock signals to the image sensor and lens assembly 280 to control the frame rate of the image sensor and lens assembly 280.

Figure 9:
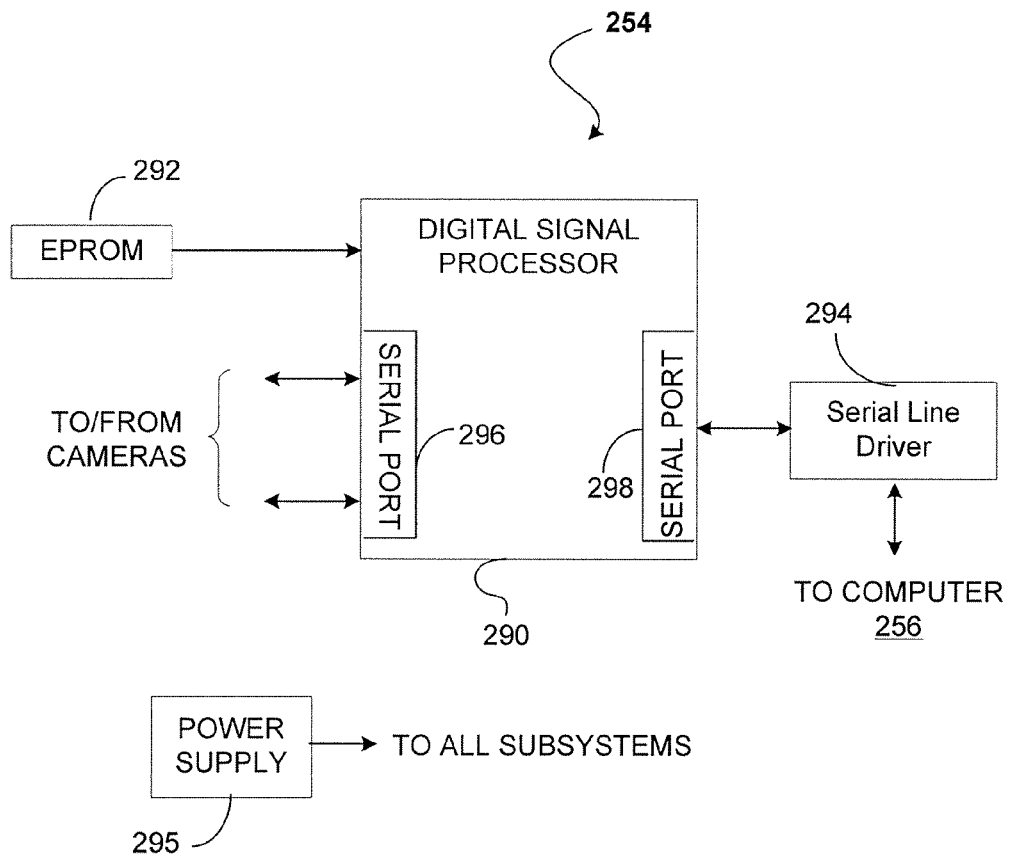
FIG. 9 is a schematic diagram of a master controller forming part of the touch system of FIG. 6.

As illustrated in FIG. 9, master controller 254 includes a DSP 290, a boot EPROM 292, a serial line driver 294 and a power supply subsystem 295. The DSP 290 communicates with the DSPs 284 of each of the camera systems 263 over a data bus and via a serial port 296. The DSP 290 also communicates with the computer 256 via a data bus, a serial port 298, and the serial line driver 294. In this embodiment, the DSP 290 is also manufactured by Analog Devices under part number ADSP2185M. The serial line driver 294 is manufactured by Analog Devices under part number ADM222.

The master controller 254 and each camera system 263 follow a communication protocol that enables bi-directional communications via a common serial cable similar to a universal serial bus (USB). The transmission bandwidth is divided into thirty-two (32) 16-bit channels. Of the thirty-two channels, five (5) channels are assigned to each of the DSPs 284 in the camera system 263 and to the DSP 290 in the master controller 254. The remaining seven (7) channels are unused. The master controller 254 monitors the twenty (20) channels assigned to the camera system DSPs 284 while the DSPs 284 in each of the camera systems 263 monitor the five (5) channels assigned to the master controller DSP 290. Communications between the master controller 254 and each of the camera systems 263 are performed as background processes in response to interrupts.

The general operation of the passive touch system 250 will now be described in association with system 100 (FIG. 1A), whereby the planar shaped medium 102 (FIG. 1A) forms the touch screen 260. In this embodiment, it is possible to superimpose the planar shaped medium 102 onto the existing touch screen 260 and therefore adapt system 100 for use with passive touch system 250. Alternatively, the planar shaped medium 102 may form an integral part of the touch screen 260 such that system 100 is an integral part of the passive touch system 250.

Each camera system 263 acquires images of the touch surface 260 within the field of view of its image sensor and lens assembly 280 at the frame rate established by the DSP clock signals and processes the images to determine if a pointer is in the acquired images. If a pointer is in the acquired images, the images are further processed to determine characteristics of the pointer contacting or hovering above the touch surface 260. The contacting of the pointer with touch surface 260 is detected by the camera as one or more illuminated regions that are created by frustrated optical signals that are emitted at the point of contact of the pointer with the touch surface 260. Pixel information associated with the one or more illuminated regions received is captured by the image sensor and lens assembly 280 and then processed by the camera DSPs 284. Pointer characteristics corresponding to pointer contact with the touch surface are converted into pointer information packets (PIPs) and the PIPs are queued for transmission to the master controller 254. Each of the camera systems 263 also receive and respond to diagnostic PIPs generated by the master controller 254.

The master controller 254 polls each of the camera system 263 at a set frequency (in this embodiment 70 times per second) for PIPs and triangulates pointer characteristics (e.g., pointer contact) in the PIPs to determine pointer position data. The master controller 254 in turn transmits pointer position data and/or status information to the personal computer 256. In this manner, the pointer position data transmitted to the personal computer 256 can be recorded as writing (e.g., annotations), drawing, executing a response, or can be used to control execution of application programs executed by the computer 256. The computer 256 also updates the display output conveyed to the projector 258 so that information projected onto the touch surface 260 reflects the pointer activity.

Figure 10:
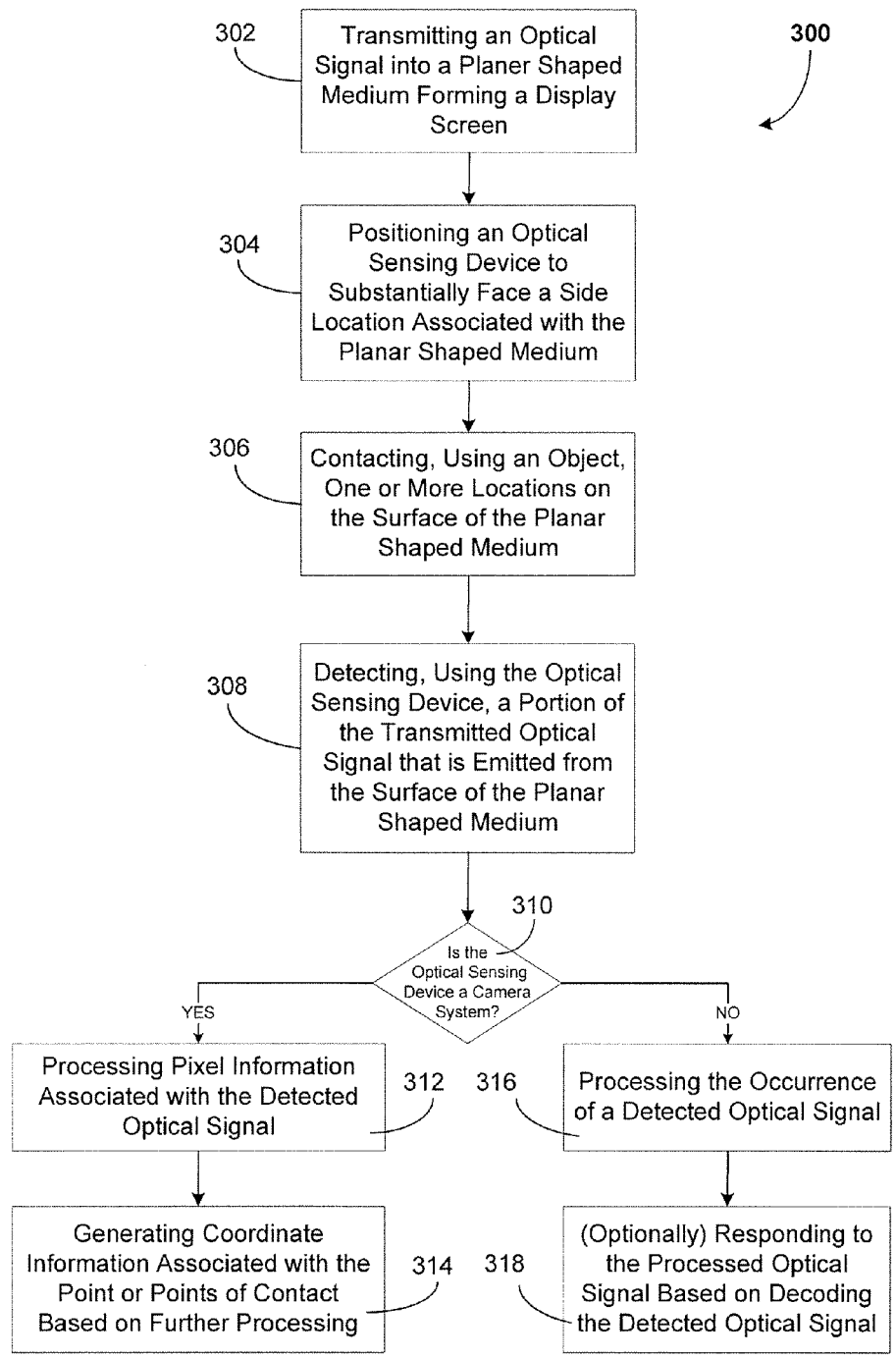
FIG. 10 is a flow diagram illustrating the operation of the embodiment of FIG. 1A.

The operation of system 100 (FIG. 1A) is now described with the aid of flow diagram 300 illustrated in FIG. 10. At step 302 an optical signal is transmitted into planar shaped medium 102 (FIG. 1A), where the planar shaped medium may form a display portion of a media presentation system such as passive touch system 250 (FIG. 6). The optical signal is totally internally reflected within the planar shaped medium 102.

At step 304, an optical sensing device such as one or more optical detectors and/or one or more camera devices 130, 132 (FIG. 1A) is positioned to substantially face a side location of the planar shaped medium and adapted to receive optical signals from the top-surface 104 (FIG. 1A) of the planar shaped medium 102. The side location of the planar shaped medium is generally the area or region surrounding the periphery such as edge facets 108, 109, 110, and 112 (FIG. 1A). For example, if other shaped planar media such as those illustrated and described in association with FIGS. 4 & 5 are utilized, the side location of the planar shaped media would generally be the area or region surrounding their edge periphery such as any one of the edge facets.

At step 306, once an object such as a user's finger or other pointer device contacts the top-surface of the planar shaped medium 102, a portion of the optical signal that is totally internally reflected within the planar medium 102 is emitted from the contact location based on the change in refractive index introduced by the contacting object. The magnitude of emitted light may depend on the surface pressure applied by the object at the contact location and the material used to apply the contact. For example, an increased pressure by the object at the contact location may increase the magnitude of optical signal emitted from the contact location. Also, the use of different materials to apply the contact may increase or decrease the amount of emitted optical signal.

At step 308, once the portion of the optical signal is emitted from the top-surface 104 based on the applied contact (step 306), the positioned optical sensing device (step 304) receives the emitted optical signal. In order to increase the detection capabilities of the optical sensing device with respect to background optical reflections, ambient light changes, or any other factors that may create a false indication of a detected optical signal, the optical source 118 (FIG. 1A) that transmits the optical signal into the planar medium 102 may be modulated and/or encoded using known techniques. By modulating and/or encoding the transmitted optical signal, the received emitted optical signal will also be modulated and/or encoded. Upon reception and processing, the modulated and/or encoded emitted optical signal facilitates distinguishing an actual emitted optical signal from spurious optical signals or intensity level changes and, therefore increases the signal-to-noise ratio of the system 100 (FIG. 1A). For example, the optical source may be encoded with a binary sequence using ON/OFF keying (OOK). The optical signal may also be intensity modulated, frequency modulated, or phase modulated. In another example, the optical source may be encoded or modulated using a Pseudo Random Binary Sequence (PRBS) generator.

If at step 310 it is determined that the optical sensing device is a camera device such as devices 130 and 132 (FIG. 1A), camera pixel information associated with the detected optical signal emitted from the planar medium 102 is captured and processed by a processor device such as the camera DSPs 284

(FIG. 8). Pointer information packets (PIPs) associated with the object contacting the location on the planar medium 102 are generated by and sent from the camera DSPs 284 to the DSP 290 or second processor device within master controller 254 (step 312). At the master controller 254, triangulation techniques may be used in conjunction with the PIPs received from the camera devices 130, 132 in order to generate coordinate information associated with the location or point(s) of contact of the object with top-surface 104 (step 314).

If at step 310 it is determined that the optical sensing device is one or more photodetectors, the detected signal associated with the emitted optical signal may be processed in order to decode the detected signal (step 316). For example, if a user contacts the top-surface 104 a few times in succession, the resultant successive detection of an increased optical intensity by the photodetector may, for example, be processed by the master controller 254 (step 316). Responsive to this processing, one or more predetermined events such as launching an application program on computer 256 (FIG. 6) may be initiated (step 318). Thus, by encoding the contacting, various events or processes may be identified and executed.

Other characteristics of the optical signal emitted from the top-surface 104 may be detected and decoded in response to the application of one or more contacts to the top-surface 104. For example, changes in the intensity of the emitted optical signal as a function of the applied pressure to a top-surface location by the object 124 (FIG. 1A), the simultaneous application of a plurality of objects (e.g., two, three, or more of the use's fingers) to the top-surface 104, and/or the successive application of contact (e.g., two or more taps) to one or more locations on the top-surface 104 may be decoded for initiating a predetermined response.

Although preferred embodiments of the present invention have been described, those of skill in the art will appreciate that variations and modifications may be made without departing from the spirit and scope thereof as defined by the appended claims.

What is claimed is:

1. A system for detecting contact on a display, the system comprising:
    a planar medium associated with the display and including at least one edge facet and opposing surfaces;
    at least one optical source operatively coupled to the at least one edge facet for transmitting an optical signal into the planar medium such that the transmitted optical signal is totally internally reflected between the at least one edge facet and opposing surfaces; and
    an optical sensing device positioned to substantially face at least a portion of the at least one edge facet and adapted to detect at least one object contacting a first surface of the opposing surfaces, wherein the optical sensing device is operative to detect a portion of the optical signal emitted from the first surface at a location corresponding to the at least one object contacting the first surface.

2. The system according to claim 1, wherein the at least one edge facet comprises a single circular shaped edge facet having an optically reflective surface.

3. The system according to claim 1, wherein the at least one edge facet comprises at least one curved edge facet and at least one straight edge facet each having an optically reflective surface.

4. The system according to claim 1, wherein the at least one edge facet comprises a first edge facet, a second edge facet, a third edge facet, and a fourth edge facet each comprising an optically reflective surface.

5. The system according to claim 1, wherein the optical sensing device comprises at least one of the group consisting of at least one photodetector and at least two camera devices.

6. A system for detecting contact on a display, the system comprising:
    a planar medium associated with the display and including at least one edge facet and opposing surfaces;
    at least one optical source operatively coupled to the at least one edge facet for transmitting an optical signal into the planar medium such that the transmitted optical signal is totally internally reflected between the at least one edge facet and opposing surfaces; and
    at least two camera devices positioned to substantially face at least a portion of the at least one edge facet and adapted to detect at least one object contacting a first surface of the opposing surfaces, wherein the at least two camera devices are operative to capture images of a portion of the optical signal emitted from the first surface at a location corresponding to the at least one object contacting the first surface.

7. The system according to claim 6, further comprising at least one processor coupled to the at least two camera devices, wherein the at least one processor is adapted to process pixel information corresponding to the at least one object contacting the first surface.

8. The system according to claim 7, further comprising a master controller coupled to the at least one processor, wherein the master controller is adapted to generate location coordinate information corresponding to the at least one object contacting the first surface.

9. The system according to claim 8, further comprising at least one application program operative to receive the location coordinate information for displaying an annotation associated with the at least one object contacting the surface.

10. The system according to claim 8, further comprising at least one application program operative to receive the location coordinate information for executing a response based the at least one object contacting the surface.

11. The system according to claim 6, wherein the at least one edge facet comprises a single circular shaped edge facet having an optically reflective surface.

12. The system according to claim 6, wherein the at least one edge facet comprises at least one curved edge facet and at least one straight edge facet each having an optically reflective surface.

13. The system according to claim 6, wherein the at least one edge facet comprises a first edge facet, a second edge facet, a third edge facet, and a fourth edge facet each comprising an optically reflective surface.

14. The system according to claim 13, wherein the optically reflective surface comprises at least one of copper reflective tape and silver reflective tape.

15. The system according to claim 6, wherein the planar medium comprises an acrylic sheet coupled to the display, the acrylic sheet having substantially the same shape as the display.

16. The system according to claim 15, wherein the acrylic sheet comprises fire polished acrylic edges.

17. The system according to claim 6, wherein the at least one optical source comprises a light emitting diode (LED).

18. The system according to claim 17, wherein the light emitting diode (LED) comprises a viewing half angle of about 0-90 degrees.

19. The system according to claim 6, wherein the at least one optical source comprises a laser device.

20. The system according to claim 6, wherein the transmitted optical signal comprises an infrared signal.

21. The system according to claim 6, wherein the transmitted optical signal comprises visible light.

22. The system according to claim 6, wherein the at least two camera devices comprise complementary metal oxide semiconductor (CMOS) cameras.

23. The system according to claim 6, wherein the portion of the optical signal emitted from the location on the first surface comprises a frustrated total internal reflection (FTIR) optical signal generated at the location based on the at least one object contacting the location.

24. The system according to claim 6, further comprising a screen associated with the display, wherein the screen is coupled to a second surface of the opposing surfaces.

25. The system according to claim 6, wherein the planar medium comprises an integral component of the display.

26. The system according to claim 6, wherein the at least one object comprises a finger associated with a user interacting with the first surface of the planar medium.

27. The system according to claim 6, wherein the at least one object comprises a cylindrical pen shaped object adapted to be used by a user interacting with the first surface of the planar medium.

28. The system according to claim 6, wherein the transmitted optical signal comprises a modulated signal.

29. The system according to claim 6, wherein the transmitted optical signal comprises an encoded signal.

30. The system according to claim 29, wherein the encoded signal comprises a binary sequence.

31. The system according to claim 28, wherein the modulated signal comprises a pseudo random binary sequence (PRBS) modulated signal.

32. The system according to claim 28, wherein the modulated signal comprises an intensity modulated signal.

33. A method of detecting contact to a display, comprising:
transmitting an optical signal into a planar medium associated with the display, wherein within the planar medium the transmitted optical signal is totally internally reflected;
positioning an optical sensing device to substantially face a side location associated with the planar medium;
contacting a surface location on the first surface using at least one object; and
detecting using the optical sensing device a portion of the optical signal emitted from the surface location based on the object contacting the surface location.

34. A method of detecting contact to a display, comprising:
transmitting an optical signal into a planar medium associated with the display, wherein within the planar medium the transmitted optical signal is totally internally reflected;
positioning a first camera device to substantially face a first side location associated with the planar medium, wherein the first camera device receives images from a first surface of the planar medium;
positioning a second camera device to substantially face a second side location associated with the planar medium, wherein the second camera device receives images from the first surface of the planar medium;
contacting a surface location on the first surface using at least one object; and
capturing using the first and second camera images of a portion of the optical signal emitted from the surface location based on the object contacting the surface location.

35. The method according to claim 34, further comprising determining a coordinate position associated with the at least one object at the surface location based on the captured images.

36. The method according to claim 34, wherein the captured images of the portion of the optical signal emitted from the surface location comprises an illuminated region.

37. The method according to claim 34, wherein a second surface of the planar medium is coupled to the display.

38. The method according to claim 34, wherein the portion of the optical signal emitted from the surface location is based on a Frustrated Total Internal Reflection (FTIR) of the optical signal at the contacted surface location.

39. The method according to claim 34, wherein the portion of the optical signal emitted from the surface location is responsive to a change in refractive index associated with the surface location.

40. The method according to claim 34, wherein the first camera includes a first field of view and the second camera includes a second field of view, the first and second field of view having an area of overlap.

41. The method according to claim 40, wherein contacting the surface location on the first surface using the at least one object comprises changing a refractive index value associated with the first surface at the contacted surface location.

42. A passive touch system, comprising:
a touch screen having opposing surfaces and adapted to receive an optical signal that is totally internally reflected within the opposing surfaces, wherein upon an object contacting a surface location associated with the opposing surfaces a portion of the optical signal is emitted from the surface location; and
at least two cameras associated with the touch surface and positioned substantially at a side location to the touch surface, wherein at the surface location images of the portion of the optical signal emitted from the surface location are captured by the at least two cameras for determining a coordinate position associated with the object contacting the surface location.

43. The system according to claim 42, further comprising at least one first processor operatively coupled to the at least two cameras, the at least one first processor adapted to receive the captured images and generate pixel data associated with the captured images.

44. The system according to claim 43, further comprising a second processor operatively coupled to the at least one first processor, wherein the second processor receives the generated pixel data and generates location coordinate information for the object at the surface location.

45. The system according to claim 42, wherein the at least two cameras comprise complementary metal oxide semiconductor (CMOS) cameras.

\* \* \* \* \*